United States Patent
Jiang et al.

(10) Patent No.: US 12,300,798 B2
(45) Date of Patent: May 13, 2025

(54) MULTILAYER SHEET FOR PREVENTING THERMAL RUNAWAY

(71) Applicant: Rogers Corporation, Chandler, AZ (US)

(72) Inventors: Jing Jiang, Suzhou (CN); Wei Wang, Burlington, MA (US); Jian Zhang, Suzhou (CN); Lei Liu, Suzhou (CN); Christopher Churchill, Dayville, CT (US); Aniruddha Shere, Chelmsford, MA (US); Murali Sethumadhavan, Waxhaw, NC (US)

(73) Assignee: ROGERS CORPORATION, Chandler, AZ (US)

( * ) Notice: Subject to any disclaimer, the term of this patent is extended or adjusted under 35 U.S.C. 154(b) by 554 days.

(21) Appl. No.: 17/539,619

(22) Filed: Dec. 1, 2021

(65) Prior Publication Data
US 2022/0181715 A1    Jun. 9, 2022

Related U.S. Application Data

(60) Provisional application No. 63/121,334, filed on Dec. 4, 2020.

(51) Int. Cl.
*H01M 10/658* (2014.01)
*B32B 5/18* (2006.01)
(Continued)

(52) U.S. Cl.
CPC ............ *H01M 10/658* (2015.04); *B32B 5/18* (2013.01); *B32B 7/12* (2013.01); *B32B 9/046* (2013.01);
(Continued)

(58) Field of Classification Search
CPC .......... H01M 10/658; B32B 5/18; B32B 7/12; B32B 9/046; B32B 2266/126;
(Continued)

(56) References Cited

U.S. PATENT DOCUMENTS 3,868,346 A   2/1975   Merrill
3,912,650 A   10/1975  Khalid et al.
(Continued)

FOREIGN PATENT DOCUMENTS

CN   102117945 A    7/2011
CN   102838342 B    10/2013
(Continued)

OTHER PUBLICATIONS

Weng, "Alleviation of thermal runaway propagation in thermal management modules using aerogel felt coupled with flame-retarded phase change material", Energy Conversion and Management (Year: 2019).*
(Continued)

*Primary Examiner* — Christian Roldan
*Assistant Examiner* — Robert Gene West
(74) *Attorney, Agent, or Firm* — CANTOR COLBURN LLP

(57) ABSTRACT

A thermally insulating multilayer sheet includes a compressible layer, and a thermal insulation layer, a flame retardant layer, or a combination thereof disposed on the compressible layer.

20 Claims, 9 Drawing Sheets

(51) Int. Cl.
*B32B 7/12* (2006.01)
*B32B 9/04* (2006.01)

(52) U.S. Cl.
CPC . *B32B 2266/0278* (2013.01); *B32B 2266/126* (2016.11); *B32B 2307/304* (2013.01); *B32B 2307/3065* (2013.01); *B32B 2307/72* (2013.01); *B32B 2307/732* (2013.01); *B32B 2457/10* (2013.01)

(58) Field of Classification Search
CPC ...... B32B 2266/0278; B32B 2307/304; B32B 2307/3065; B32B 2307/72; B32B 2307/732; B32B 2457/10
USPC .......................................................... 429/120
See application file for complete search history.

(56) References Cited

U.S. PATENT DOCUMENTS

| | | | |
|---|---|---|---|
| 4,833,190 | A | 5/1989 | Cella et al. |
| 9,676,168 | B2 | 6/2017 | Contzen et al. |
| 9,748,542 | B2 | 8/2017 | Sakamoto et al. |
| 9,825,345 | B2 | 11/2017 | Liu et al. |
| 10,833,300 | B2 | 11/2020 | Verhaag et al. |
| 11,702,346 | B2 | 7/2023 | Evans et al. |
| 11,905,647 | B2 | 2/2024 | Oikawa et al. |
| 2003/0047718 | A1 | 3/2003 | Narayan et al. |
| 2006/0261304 | A1 | 11/2006 | Muthukumaran et al. |
| 2007/0238008 | A1 | 10/2007 | Hogan et al. |
| 2007/0264485 | A1 | 11/2007 | Stepanian et al. |
| 2009/0029147 | A1 | 1/2009 | Tang et al. |
| 2011/0111196 | A1 | 5/2011 | Hubbs |
| 2014/0255628 | A1* | 9/2014 | Fesmire ................ B32B 15/046 156/60 |
| 2016/0380244 | A1 | 12/2016 | Evans et al. |
| 2017/0352935 | A1 | 12/2017 | Perdu et al. |
| 2019/0140237 | A1* | 5/2019 | Kaye ................... H01M 10/653 |
| 2020/0239367 | A1* | 7/2020 | Huth ....................... C04B 28/26 |
| 2020/0358154 | A1* | 11/2020 | Wang .................. H01M 50/129 |
| 2021/0013460 | A1 | 1/2021 | Ootsuki et al. |
| 2021/0047548 | A1 | 2/2021 | Jacobmeier et al. |
| 2021/0163303 | A1 | 6/2021 | Evans et al. |
| 2021/0167438 | A1 | 6/2021 | Evans et al. |
| 2021/0257690 | A1 | 8/2021 | Kilhenny et al. |
| 2021/0288362 | A1 | 9/2021 | Churchill |
| 2021/0316537 | A1 | 10/2021 | Adam, Jr. et al. |
| 2022/0388291 | A1 | 12/2022 | Wang et al. |
| 2022/0389152 | A1 | 12/2022 | Wang et al. |
| 2022/0410528 | A1 | 12/2022 | Wang et al. |
| 2023/0032529 | A1 | 2/2023 | Evans et al. |

FOREIGN PATENT DOCUMENTS

| | | | |
|---|---|---|---|
| CN | 105489965 | | 4/2016 |
| CN | 205811021 U | | 12/2016 |
| CN | 206379410 U | | 8/2017 |
| CN | 107420686 A | * | 12/2017 |
| CN | 105742755 B | | 4/2018 |
| CN | 107986288 A | | 5/2018 |
| CN | 109595429 A | * | 4/2019 ............ F16L 59/028 |
| CN | 110256035 A | | 9/2019 |
| CN | 110551397 A | | 12/2019 |
| CN | 210652147 U | | 6/2020 |
| CN | 210705210 U | | 6/2020 |
| CN | 210705229 U | | 6/2020 |
| CN | 220341331 U | | 1/2024 |
| EP | 3611790 A1 | | 2/2020 |
| JP | 2004137308 A | | 5/2004 |
| JP | 2019096410 A | | 6/2019 |
| JP | 2020087741 | | 6/2020 |
| JP | 7364722 B2 | | 10/2023 |
| JP | 7392051 B1 | | 11/2023 |
| JP | 7414888 B2 | | 1/2024 |
| JP | 2024003709 A | | 1/2024 |
| JP | 2024027200 A | | 3/2024 |
| WO | 2002052086 A2 | | 7/2002 |
| WO | 2011084804 A2 | | 7/2011 |
| WO | 2017132413 A1 | | 8/2017 |
| WO | 2018011384 A1 | | 1/2018 |
| WO | 2018148282 A1 | | 8/2018 |
| WO | 2019154677 A1 | | 8/2019 |
| WO | 2019167612 A1 | | 9/2019 |
| WO | 2020047846 A1 | | 3/2020 |
| WO | 2020186494 A1 | | 9/2020 |
| WO | 2020186495 A1 | | 9/2020 |
| WO | 2020194938 A1 | | 10/2020 |
| WO | 2020219996 A1 | | 10/2020 |
| WO | 2020221808 A1 | | 11/2020 |
| WO | 2020222663 A1 | | 11/2020 |
| WO | 2021019495 A1 | | 2/2021 |
| WO | 2021022130 A1 | | 2/2021 |
| WO | 2021142169 A1 | | 7/2021 |

OTHER PUBLICATIONS

Gao, "Insulating glazing units with silica aerogel granules: The impact of particle size", Applied Energy, 128, 27-34 (Year: 2014).*
Hamdani et al., "Flame Retardancy of Silicone-Based Materials", Polmer Degradation and Stability 94 (2009) pp. 465-495.
International Search Report for International Application No. PCT/US2021/061378; International Filing Date: Dec. 1, 2021; Date of Mailing: Mar. 23, 2022; 17 pages.
Song et al., "Effects of Inorganics on Thermal Property of Dolicone Rubber Composites", 21st International Conferenc on Composite Materials Xi'an, Aug. 20-25, 2017; 10 pages.
Written Opinion for International Application No. PCT/US2021/061378; International Filing Date: Dec. 1, 2021; Date of Mailing: Mar. 23, 2022; 8 pages.
International Preliminary Report on Patentability of the PCT issued May 30, 2023 for International PCT Application No. PCT/US2021/061378 filed Dec. 1, 2021, 9 pages.

* cited by examiner

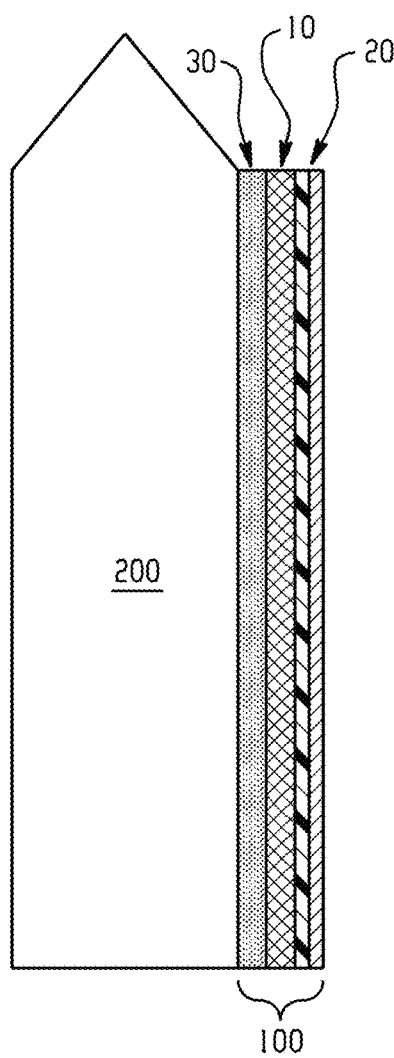
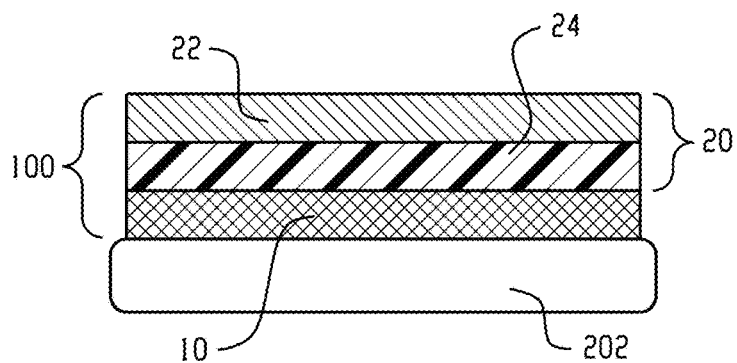
Fig. 1B
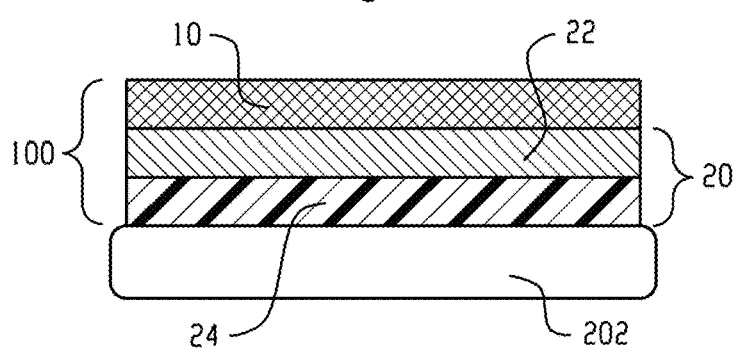
Fig. 1C
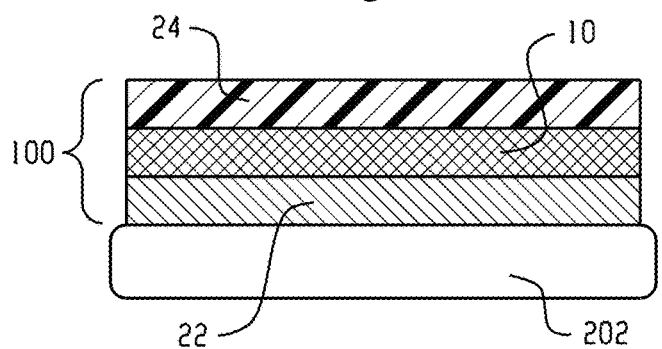
Fig. 1D
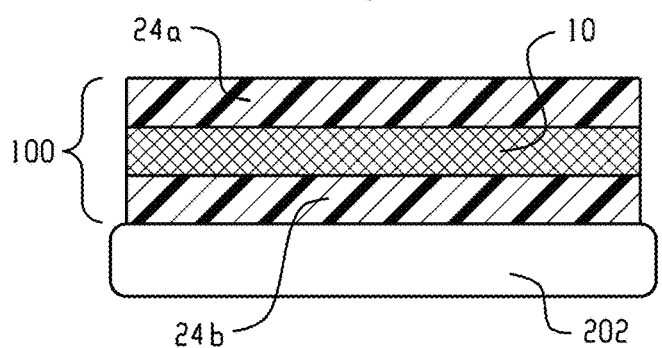
Fig. 1E
Fig. 1A

MULTILAYER SHEET FOR PREVENTING THERMAL RUNAWAY

CROSS-REFERENCE TO RELATED APPLICATION

This application claims priority to and the benefit of U.S. Provisional Application No. 63/121,334 filed on Dec. 4, 2020, the entire content of which is incorporated herein by reference.

BACKGROUND

This application is directed to a thermally insulating multilayer sheet for delaying or preventing thermal runaway for use in batteries, particular for using in delaying or preventing thermal runaway in batteries. The application is further directed to methods for the manufacture of the thermally insulating multilayer sheets, and battery components and batteries including the thermally insulating multilayer sheets.

The demand for electrochemical energy storage devices, such as lithium-ion batteries, is ever increasing due to the growth of applications such as electric vehicles and grid energy storage systems, as well as other multi-cell battery applications, such as electric bikes, uninterrupted power battery systems, and replacements for lead acid batteries. For large format applications, such as grid storage and electric vehicles, multiple electrochemical cells connected in series and parallel arrays are often used. Once a cell is in thermal runaway mode, the heat produced by the cell can induce a thermal runaway propagation reaction in adjacent cells, with the potential to cause a cascading effect that can ignite the entire battery.

While attempts to reduce the flammability of batteries have been considered, many have drawbacks. For example, modifying the electrolyte by adding flame retardant additives, or using inherently non-flammable electrolytes have been considered, but these approaches can negatively impact the electrochemical performance of the lithium ion cell. Other approaches to prevent cascading thermal runaway include incorporating an increased amount of insulation between cells or clusters of cells to reduce the amount of thermal heat transfer during a thermal event. However, these approaches can limit the upper bounds of the energy density that can be achieved.

With the increasing demand for batteries with reduced risk of thermal runaway, there is accordingly a need for methods and components for use in batteries that prevents or delays the spread of heat, energy, or both to surrounding cells.

BRIEF SUMMARY

In an aspect a thermally insulating multilayer sheet for delaying or preventing thermal runaway includes a compressible layer, and a thermal insulation layer comprising an aerogel or a polymer matrix comprising microspheres.

In an aspect, electrochemical unconnected arrays and batteries including the above-described thermally insulating multilayer sheet are also described.

The above-described and other features are exemplified by the following figures, detailed description, examples, and claims.

BRIEF DESCRIPTION OF THE DRAWINGS

The following is a brief description of the drawings, which are presented for the purpose of illustrating the exemplary aspects disclosed herein and not for the purpose of limiting the same.

FIG. 1A is a schematic illustration of a pouch cell with a thermally insulating multilayer sheet for delaying or preventing thermal runaway adhered to an exterior of the pouch cell; FIG. 1B is a schematic illustration of an electrochemical cell and another aspect of a thermally insulating multilayer sheet for delaying or preventing thermal runaway; FIG. 1C is a schematic illustration of a cell and another aspect of a thermally insulating multilayer sheet for delaying or preventing thermal runaway; FIG. 1D is schematic illustration of a cell and another aspect of a thermally insulating multilayer sheet for delaying or preventing thermal runaway; and FIG. 1E is schematic illustration of a cell and another aspect of a thermally insulating multilayer sheet for delaying or preventing thermal runaway;

DETAILED DESCRIPTION

Figure 2:
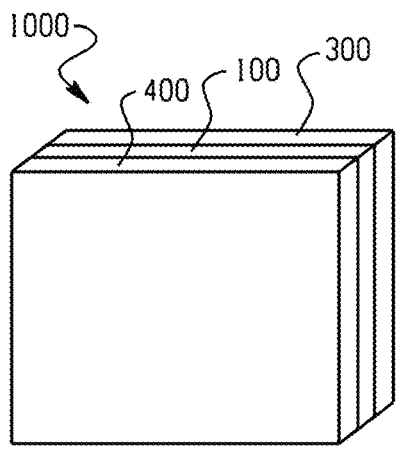
FIG. 2 is an illustration of an aspect of a thermally insulating multilayer sheet for delaying or preventing thermal runaway located in between two cells.

Preventing thermal runaway in batteries, especially batteries that include a large plurality of electrochemical cells, is a difficult problem, as a cell adjacent to a cell experiencing a thermal runaway can absorb enough energy from the event to cause it to rise above its designed operating temperatures, triggering the adjacent cells to also enter into thermal runaway. This propagation of an initiated thermal runaway event can result in a chain reaction in which cells enter into a cascading series of thermal runaways, as the cells ignite adjacent cells. In order to prevent such cascading thermal runaway events from occurring, a thermally insulating multilayer sheet for delaying or preventing thermal runaway can be used. The thermally insulating multilayer sheet includes at least a compressible layer, as well as a thermal insulation layer comprising an aerogel or a polymer matrix comprising microspheres. The thermal barrier provided by the thermally insulating multilayer sheet can be used in various sites in batteries to prevent thermal runaway. The thermally insulating multilayer sheet can further improve the fire resistance of batteries.

The thermally insulating multilayer sheet can have a total thickness of 0.2 to 30 millimeters (mm), preferably 0.5 to 10 mm, more preferably 1 to 3 mm; and a density of 6 to 30 pounds per cubic foot (lb/ft$^3$) (96 to 481 kilograms per cubic meter (kg/m$^3$)), preferably 6 to 15 lb/ft$^3$ (96 to 240 kg/m$^3$), more preferably 6 to 10 lb/ft$^3$ (96 to 160 kg/m$^3$).

As illustrated in FIG. 1, the thermally insulating multilayer sheet for delaying or preventing thermal runaway 100 can be directly placed on or adhered to the exterior surface of a pre-formed cell, for example, on the exterior surface of a pouch cell 200. As shown, a compressible layer 10 is disposed on the pouch cell 200, and the thermal insulation layer, and optionally a flame retardant layer, are directly disposed on the compressible layer 10. In an aspect, layer 20 includes only a thermal insulation layer. In a preferred aspect, layer 20 includes both a thermal insulation layer and a flame retardant layer.

The thermally insulating multilayer sheet 100 can be attached to pouch cell 200 by an adhesive layer. Further as shown in FIG. 1, an adhesive layer 30 is disposed between the pouch cell and the compressible layer 10. In an aspect the adhesive is not present, and the compressible layer can be disposed directly on the cell, for example pouch cell 200. Further as shown in FIG. 1, the thermal insulation layer, and optionally the flame retardant layer, is disposed directly on the compressible layer. In another aspect, the thermal insulation layer, and optionally the flame retardant layer, can be adhered the compressible layer 10 by an adhesive layer. Multiple adhesive layers can be present. Each of these layers is described in further detail below.

The individual layers of the thermally insulating multilayer sheet can be present in any order, and in direct contact. Optionally, one or more adhesive layers can be disposed between each individual layer.

In an aspect, the thermally insulating multilayer sheet includes both the flame retardant layer and thermal insulation layer. The flame retardant layer can be disposed on a first side of the thermal insulation layer, and a second, opposite side of the thermal insulation layer can be disposed on the compressible layer. The thermally insulating multilayer sheet can further include an additional thermal insulation layer disposed on a side of the compressible layer opposite to the thermal insulation layer. The thermally insulating multilayer sheet can further include an additional flame retardant layer disposed on the additional thermal insulation layer opposite to the compressible layer. The thermally insulating multilayer sheet can further include an additional flame retardant layer disposed on a second side of the compressible layer opposite the thermal insulation layer.

For example, FIG. 1B shows a flame retardant layer 22 disposed directly on thermal insulation layer 24, which is disposed directly on compressive layer 10, which is disposed directly on a surface of a cell 202 (for example a pouch cell). Optionally, an adhesive layer can be disposed between the flame retardant layer 22 and the thermal insulation layer 24, or between the thermal insulation layer 24 and the compressive layer 10, or between the compressive layer 10 and the surface of a cell 202, or between all layers and a surface of cell 202.

In another aspect, layer 20 can be disposed directly on a surface of the cell. For example, as shown in FIG. 1C, compressible layer 10 is disposed directly on flame retardant layer 22, which is disposed directly on thermal insulation layer 24, which is disposed directly on a surface of a cell 202, preferably a pouch cell. As in the other aspects, one or more adhesive layers can be present between any two layers or between a layer and the electrochemical cell.

It is further possible for the compressible layer or the thermal insulation layer (or both) to be disposed between a flame retardant layer and a thermal insulation layer. As shown in FIG. 1D, thermal insulation layer 24 is disposed on compressible layer 10, which is disposed on flame retardant layer 22, which is disposed directly on a surface of a cell 202, preferably a pouch cell. Alternatively, the thermal insulation layer can be disposed directly on a surface of a cell 202, preferably a pouch cell. As in the other aspects, one or more adhesive layers can be present between any two layers or between a layer and the electrochemical cell.

In an aspect, more than one compressible layer, thermal insulation layer, or flame retardant layer can be present. In an aspect, two thermal insulation layers can be present. For example, FIG. 1E shows first thermal insulation layer 24a disposed directly on compressible layer 10, which is disposed directly on a second thermal insulation layer 24b, which is disposed directly on a surface of a cell 202, preferably a pouch cell. Each thermal insulation layer can be the same or different. A flame retardant layer can be optionally included, for example disposed on the first thermal insulation layer 24a on a side opposite the compressible layer 10, or between one or both of the thermal insulation layers and the compression layer, or a combination thereof. Again, one or more adhesive layers can be present between each layer or between a layer and the electrochemical cell. As in the other aspects, one or more adhesive layers can be present between any two layers or between a layer and the electrochemical cell.

Figure 4:
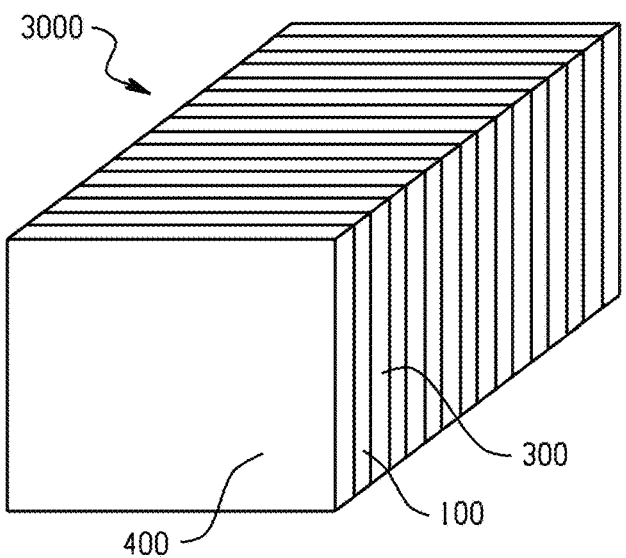
FIG. 4 is an illustration of an aspect of a thermally insulating multilayer sheet for delaying or preventing thermal runaway located in between an array of cells.
Figure 3:
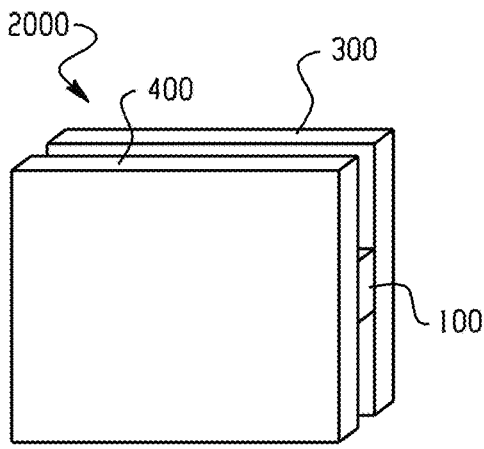
FIG. 3 is an illustration of an aspect of a thermally insulating multilayer sheet for delaying or preventing thermal runaway located in between two cells.

FIG. 2 illustrates a non-limiting example of the positioning of the thermally insulating multilayer sheet in a multi-cell arrangement 1000. FIG. 3 illustrates a non-limiting example of the positioning of the thermally insulating multilayer sheet in a multi-cell arrangement 2000, and FIG. 4 illustrates a non-limiting example of the positioning of the thermally insulating multilayer sheet in a multi-cell arrangement 3000. FIG. 2 and FIG. 3 illustrate that the thermally insulating multilayer sheet 100 can be located in between a first cell 300 and a second cell 400. FIG. 2 illustrates that the thermally insulating multilayer sheet 100 can be approximately the same size as the height and width of the cells 300, 400. FIG. 3 illustrates that the thermally insulating multilayer sheet 100 can be smaller than the respective cells 300, 400.

FIG. 4 illustrates that multi-cell arrangement 3000 can include more than two cells (e.g., 300, 400) with thermally insulating multilayer sheet 100 located in between the respective cells 300, 400. The cells can be lithium-ion cells, in particular pouch cells.

Figure 5:
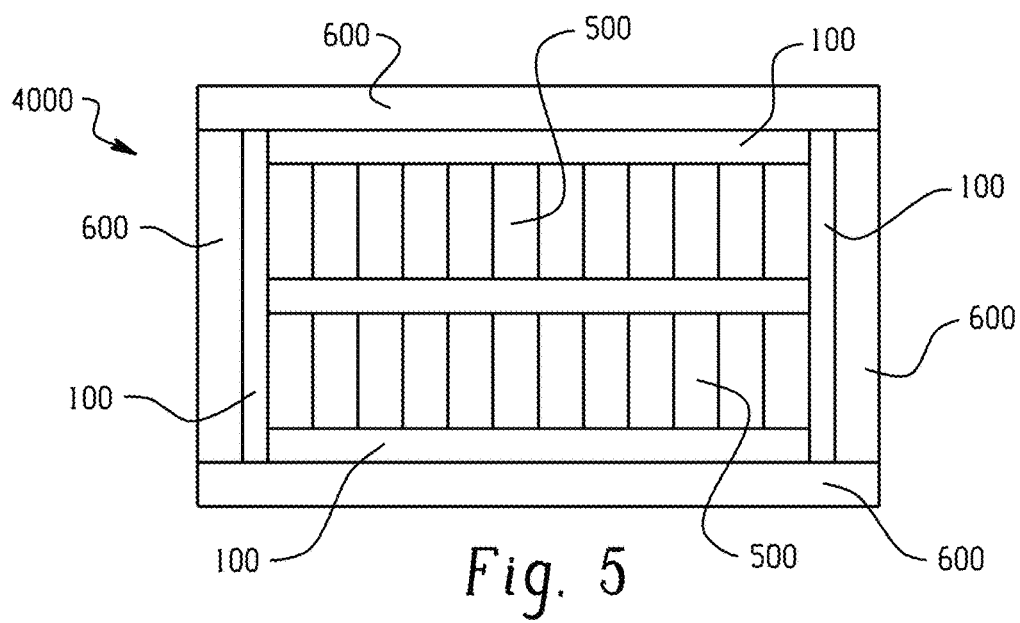
FIG. 5 is an illustration of an aspect of a battery including the thermally insulating multilayer sheet.

In an aspect, two to ten fire-resistant thermally insulating multilayer sheets can be disposed on/in a cell during manufacture of the cell. For example, two to ten thermally insulating multilayer sheets can be disposed on the interior, e.g., facing the electrodes, or exterior, facing outside of the battery. For example, two to ten fire-resistant thermally insulating multilayer sheets can be disposed on (adhesive facing out) or adhered to a pouch cell, or both. In an aspect, as illustrated in FIG. 5, the thermally insulating multilayer sheet 100 can provide pressure or thermal management in a battery 4000. For example, a battery 4000 can contain a plurality of unconnected arrays 500 inside a housing or cell carrier 600. As used herein, the phrase "unconnected array" refers to a group of cells not connected to terminals of a battery. The thermally insulating multilayer sheet 100 can be placed between individual cells in the unconnected array. The thermally insulating multilayer sheet 100 can be placed, adhered, or a combination thereof at the top, in between, below, adjacent, or a combination thereof the sides of unconnected array 500, a portion thereof, or a selected cell of unconnected arrays in the battery 4000. The thermally insulating multilayer sheet 100 can be placed, adhered, or a combination thereof beneath the battery 4000, a portion of each cell or unconnected array, or a selected set of cells or unconnected arrays. Placement or adhesion on one or more of the sides, which include the front or back, are also possible. Again, the thermally insulating multilayer sheet 100 can be placed, adhered, or a combination thereof on a portion or the entirety of the one or more sides.

In an aspect, a battery includes a battery case housing one or more cells or unconnected arrays. The thermally insulating multilayer sheet can be placed between individual cells or unconnected arrays in the battery. The thermally insulating multilayer sheet can be placed at the top, in between, below, adjacent, or a combination thereof the sides of the cells or unconnected arrays in the battery, a portion thereof, or a selected set of cells or unconnected arrays in the battery. The thermally insulating multilayer sheet, for example, with no exposed adhesive, can be placed or adhered to a plurality of pouch cells, pressure management pads, cooling plates, or other interior battery components. The assembly pressure of the battery can hold stacked components into place.

The thermally insulating multilayer sheet can be used in a battery that includes an unconnected array, i.e., a plurality of electrochemical cells. Cells include prismatic cells, pouch cells, cylindrical cells, and the like.

The individual layers of thermally insulating multilayer sheet 100 will be described next.

Compressible Layer

The compressible layer provides pressure management and can be a low density, cellular material that allows for the expansion of the cell. The compressible layer should also have good compression set resistance and minimal stress relaxation, preferably less than 10% compression and force retention of greater than 50%. The compressible layer can be thermally conductive. For example, the compressible layer can have a low thermal conductivity (Tc), for example a Tc of 0.01 to 0.5 watts per meter kelvin (W/m*K) at 23° C., or 0.01 to 0.09 W/m*K at 23° C. The compressible layer can be a polymer foam, an elastomeric polymer, or an aerogel.

Exemplary compressible layers can include a polymer foam such as a polyurethane foam or a silicone foam, or an elastomeric polymer such as vinyl acetate (EVA), thermoplastic elastomers (TPE), EPM (ethylene-propylene rubber) and EPDM rubbers (ethylene-propylene-diene rubber). For example, the compressible layer can include a foam such as a PORON® polyurethane foam or a BISCO® silicone foam that have reliable compression set resistance (c-set) and stress relaxation performance over a broad range of temperatures.

As used herein, "foams" refers to materials having a cellular structure. Exemplary foams for use in the compressible layer have densities lower than 65 lb/ft$^3$ (1,041 kg/m$^3$), preferably less than or equal to 55 lb/ft$^3$ (881 kg/m$^3$), more preferably less than or equal to 25 lb/ft$^3$ (400 kg/m$^3$), a void volume content of at least 5 to 99%, preferably greater than or equal to 30%, based upon the total volume of the polymer foam, or a combination thereof. In an aspect, the foam has a density of 5 to 30 lb/ft$^3$ (80 to 481 kg/m$^3$), a 25% compression force deflection 0.5 to 100 psi (3.4 to 689 kilopascals (kPa)), and a compression set at 70° F. (21° C.) of less than 10%, preferably less than 5%.

Examples of polymeric thermosetting resins that can be used in the polymer foams include polyurethanes, epoxies, phenolics, polyesters, polyamides, silicones, and the like, or a combination thereof. Blends of thermosetting resins as well as blends of thermoplastic resins with thermosetting resins can be used.

In an aspect, the thermally insulating multilayer sheet includes a compressible polyurethane foam, such as an open cell, low modulus polyurethane foam, which can have an average cell size of 0.05 to 0.25 mm, as may be measured, for example, in accordance with ASTM D 3574-95, a density of 5 to 50 lb/ft$^3$ (80 to 801 kg/m$^3$), preferably 6 to 25 lb/ft$^3$ (96 to 400 kg/m$^3$), a compression set of less than 10%, and a force-deflection of 1 to 250 psi (7 to 1724 kPa). Such materials are marketed under the name PORON® 4700 by the Rogers Corporation, Woodstock, Conn., preferably PORON® EVExtend 4701-43RL. PORON® foams have been formulated to provide an excellent range of properties, including compression set resistance. Foams with good compression set resistance provide cushioning, and maintain their original shape or thickness under loads for extended periods.

Silicone foams including a polysiloxane polymer can also be used. In an aspect, the silicone foams are produced as a result of the reaction between water and hydride groups in a polysiloxane polymer precursor composition with the consequent liberation of hydrogen gas. This reaction can be catalyzed by a noble metal, preferably a platinum catalyst. In an aspect, the polysiloxane polymer has a viscosity of 100 to 1,000,000 poise at 25° C. and has chain substituents such as hydride, methyl, ethyl, propyl, vinyl, phenyl, and trifluoropropyl. The end groups on the polysiloxane polymer can be hydride, hydroxyl, vinyl, vinyl diorganosiloxy, alkoxy, acyloxy, allyl, oxime, aminoxy, isopropenoxy, epoxy, mercapto groups, or other reactive end groups. Silicone foams can also be produced by using several polysiloxane polymers, each having different molecular weights (e.g., bimodal or trimodal molecular weight distributions) as long as the viscosity of the combination lies within the specified values. It is also possible to have several polysiloxane base polymers with different functional or reactive groups in order to produce the desired foam. In an aspect, the polysiloxane polymer includes 0.2 moles of hydride (Si—H) groups per mole of water.

Depending upon the chemistry of the polysiloxane polymers used, a catalyst, for example, platinum or a platinum-containing catalyst, can be used to catalyze the blowing and the curing reaction. The catalyst can be deposited onto an inert carrier, such as silica gel, alumina, or carbon black. In an aspect, an unsupported catalyst can be chloroplatinic acid, its hexahydrate form, its alkali metal salts, and its complexes with organic derivatives is used.

Certain aerogels can be used as the compressible layer. An aerogel is an open-celled solid matrix including a network of interconnected nanostructures with a porosity of greater than 50 volume percent (vol %), more preferably greater than 90 vol %. Aerogels can be derived from a gel by replacing the liquid component in the gel with a gas, or by drying a wet gel, such as by supercritical drying. Exemplary aerogels include polymer aerogels such as poly(vinyl alcohol), polyurea, polyurethane, polyimide, a resorcinol-formaldehyde polymer, polyisocyanate, epoxy, and polyacrylamide aerogels; polysaccharide aerogels including chitin and chitosan aerogels; and inorganic aerogels, for example carbon (e.g., graphene) aerogels, ceramic aerogels (e.g., boron nitride aerogels), and a metal oxide and metalloid oxide aerogels (e.g., aluminum oxide, vanadium oxide, and silica aerogels). A combination of the foregoing materials can be used.

The aerogel can have a compression force deflection of 0.2 to 150 psi (1.4 to 1,034 kPa), preferably 2 to 25 psi (13.8 to 172 kPa), each at 25% deflection, determined in accordance with ASTM D3574-17. A density of the aerogel can be 1 to 20 lb/ft$^3$ (16 to 320 kg/m$^3$), preferably 2 to 15 lb/ft$^3$ (32 to 240 kg/m$^3$), more preferably 2 to 10 lb/ft$^3$ (32 to 160 kg/m$^3$). A thickness of the aerogel can be 0.5 to 10 mm, preferably 1 to 6 mm, more preferably 2 to 3 mm.

In as aspect, the aerogel can be a silica aerogel including reinforcing fibers. The reinforcing fibers can include polyester, oxidized polyacrylonitrile, carbon, silica, polyaramid, polycarbonate, polyolefin, rayon, nylon, fiberglass, high density polyolefin, ceramics, acrylics, fluoropolymer, polyurethane, polyamide, polyimide, or a combination thereof.

An optional additive can be present in the elastomeric polymer, the polymer foam, or the aerogel. For example, the additive can include a filler (for example, alumina trihydrate, silica, talc, calcium carbonate, or clay), dye, pigment (for example, titanium dioxide or iron oxide), antioxidant, antiozonant, ultraviolet light stabilizer, a reinforcing fiber (for example a polyester, carbon, glass or polyaramid fiber, where the fibers can be in any form, such as a woven or nonwoven mat), a reinforcing particulate material (for example carbon black, talc, mica, or lignin), a thermally conductive particulate material (for example boron nitride or alumina), or an electrically conductive filler (for example carbon black or a particulate electrically conductive polymer). A combination of additives can be used.

In an aspect, the compressible layer includes polyurethane foam having a density of 5 to 65 lb/ft$^3$ (80 to 1,041 kg/m$^3$), preferably 6 to 20 lb/ft$^3$ (96 to 320 kg/m$^3$), more preferably 8 to 15 lb/ft$^3$ (128 to 240 kg/m$^3$); a thickness of 0.2 to 30 mm, preferably 0.5 to 6 mm, more preferably 1 to 3 mm; a compression force deflection of 0.2 to 125 psi (1 to 862 kPa), preferably 0.25 to 20 psi (1.7 to 138 kPa), more preferably 0.5 to 10 psi (3.4 to 68.95 kPa) each at 25% deflection determined in accordance with ASTM D3574-17; and a compression set of 0 to 15%, preferably 0 to 10%, more preferably 0 to 5%, determined in accordance with ASTM D 3574-95 Test D at 70° C.

Thermal Insulation Layer

The thermal insulation layer is configured to delay or prevent thermal runaway. It can have a thickness of 0.002 to 0.039 inches (0.05 to 0.99 mm), preferably 0.006 to 0.020 inches (0.15 to 0.5 mm). The thermal insulation layer has a low thermal conductivity (Tc) such as 0.01 to 0.09 watts per meter kelvin (W/m*K) at 23° C., high latent heat of fusion such as 70 to 350 joules per gram (J/g), or a combination thereof, to delay thermal runaway. Exemplary thermal insulation layers can include an aerogel, microspheres, or a combination thereof.

As described above, an aerogel is an open-celled solid matrix including a network of interconnected nanostructures with a porosity of greater than 50 vol %, more preferably greater than 90 vol %, and can be derived from a gel by replacing the liquid component in the gel with a gas, or by drying a wet gel, such as by supercritical drying. Exemplary aerogels for use in the thermal insulation layer include polymer aerogels such as poly(vinyl alcohol), polyurethane, polyimide, resorcinol-formaldehyde polymers, polyisocyanate, epoxy, and polyacrylamide aerogels; polysaccharide aerogels including chitin and chitosan aerogels; and inorganic aerogels, for example carbon (e.g., graphene) aerogels, ceramic aerogels (e.g., boron nitride aerogels), and metal oxide and metalloid oxide aerogels (e.g., aluminum oxide, vanadium oxide, and silica aerogels). A combination of the foregoing materials can be used.

The aerogel can have one or more of a compressive yield strength of greater than or equal to 0.1 megapascal (MPa) and a compressive modulus of greater than or equal to 1 MPa. A density of the aerogel can be 1 to 20 lb/ft$^3$ (16 to 320 kg/m$^3$), preferably 2 to 15 lb/ft$^3$ (32 to 240 kg/m$^3$), more preferably 2 to 10 lb/ft$^3$ (32 to 160 kg/m$^3$). A thickness of the aerogel can be 0.5 to 10 mm, preferably 1 to 6 mm, more preferably 1 to 3 mm.

The aerogel for use in the thermal insulation layer can be an aerogel, for example a silica aerogel including reinforcing fibers. The reinforcing fibers can include polyester, oxidized polyacrylonitrile, carbon, silica, polyaramid, polycarbonate, polyolefin, rayon, nylon, fiberglass, fiberglass mats as further described below, high density polyolefin, ceramics, acrylics, fluoropolymer, polyurethane, polyamide, polyimide, or a combination thereof.

Exemplary polymer foams for use as the thermal insulation layer include the foams described herein, in particular the polyurethane and silicone foams as described herein. In an aspect, a foam for the thermal insulation layer can have, a different compression set resistance, compression force deflection, density, or combination thereof, than a foam for the compressible layer.

Exemplary microspheres include cenospheres, glass microspheres, for example borosilicate microspheres, or a combination thereof. The microspheres are hollow spheres having a mean diameter of less than 300 micrometers (μm), for example, 15 to 200 μm, or 20 to 100 μm. The density of the hollow microspheres can range from 0.1 grams per cubic centimeter (g/cc) or greater, for example, 0.2 to 0.6 g/cc, or 0.3 to 0.5 g/cc.

Hollow microspheres are available from a number of commercial sources, for example, from Trelleborg Offshore (Boston), formerly Emerson and Cuming, Inc., W.R. Grace and Company (Canton, MA), and 3M Company (St. Paul, MN). Such hollow microspheres are referred to as microballoons, glass bubbles, microbubbles, or the like and are sold in various grades, for example, which can vary according to density, size, coatings, surface treatments, or a combination thereof.

For example, microspheres can have an exterior surface chemically modified by treatment with a coupling agent that can react with hydroxyl groups present on the surface of the glass. In an aspect, the coupling agent is a silane or epoxy, for example, an organosilane having, at one end, a group that can react with hydroxyl groups present on the exterior surface of the glass microspheres and, on the other end, an organic group that will aid in dispersibility of the microspheres in a polymer matrix that has low polarity. A difunctional silane coupling can have a combination of groups selected from vinyl, hydroxy, and amino groups, for example, 3-amino-propyltriethoxy silane. Silane coatings can also minimize water absorption.

The borosilicate microspheres can be made of alkali borosilicate glass. An exemplary oxide composition of alkali borosilicate can include 76.6 weight percent (wt %) $SiO_2$, 21.3 wt % $Na_2O$, 1.9 wt % $B_2O_3$, and 0.2 wt % other components. An exemplary soda-lime borosilicate can include 80.7 wt % $SiO_2$, 6.9 wt % $Na_2O$, 10.3 wt % CaO, 2.1 wt % $B_2O_3$, and 1.9 wt % of impurities. Thus, the composition (although mostly $SiO_2$ and including at least 1 percent $B_2O_3$) can vary to some extent, depending on the starting materials.

The size of the microspheres and their size distribution can vary. In an exemplary aspect, the borosilicate microspheres exhibit a mean particle diameter of 20 to 100 µm, for example, 20 to 75 µm, 25 to 70 µm, 30 to 65 µm, 35 to 60 µm, or 40 to 55 µm. The size distribution can be bimodal, trimodal, or the like.

The microspheres, for example the borosilicate microspheres are dispersed in a polymer matrix. Exemplary polymer matrix materials are stable in the environment of the battery, and can be thermoplastic or thermosetting. The composition can comprise a polymer, including a thermoplastic or thermoset polymer. As used herein, "polymer" includes oligomers, ionomers, dendrimers, homopolymers, and copolymers (such as graft copolymers, random copolymers, block copolymers (e.g., star block copolymers, random copolymers, and the like. Examples of thermoplastic polymers that can be used include cyclic olefin polymers (including polynorbornenes and copolymers containing norbornenyl units, for example copolymers of a cyclic polymer such as norbornene and an acyclic olefin such as ethylene or propylene), fluoropolymers (e.g., polyvinyl fluoride (PVF), polyvinylidene fluoride (PVDF), fluorinated ethylene-propylene (FEP), polytetrafluoroethylene (PTFE), poly(ethylene-tetrafluoroethylene (PETFE), perfluoroalkoxy (PFA)), polyacetals (e.g., polyoxyethylene and polyoxymethylene), poly($C_{1-6}$ alkyl)acrylates, polyacrylamides (including unsubstituted and mono-N— and di-N—($C_{1-8}$ alkyl)acrylamides), polyacrylonitriles, polyamides (e.g., aliphatic polyamides, polyphthalamides, and polyaramides), polyamideimides, polyanhydrides, polyarylene ethers (e.g., polyphenylene ethers), polyarylene ether ketones (e.g., polyether ether ketones (PEEK) and polyether ketone ketones (PEKK)), polyarylene ketones, polyarylene sulfides (e.g., polyphenylene sulfides (PPS)), polyarylene sulfones (e.g., polyethersulfones (PES), polyphenylene sulfones (PPS), and the like), polybenzothiazoles, polybenzoxazoles, polybenzimidazoles, polycarbonates (including homopolycarbonates and polycarbonate copolymers such as polycarbonate-siloxanes, polycarbonate-esters, and polycarbonate-ester-siloxanes), polyesters (e.g., polyethylene terephthalates, polybutylene terephthalates, polyarylates, and polyester copolymers such as polyester-ethers), polyetherimides (including copolymers such as polyetherimide-siloxane copolymers), polyimides (including copolymers such as polyimide-siloxane copolymers), poly($C_{1-6}$ alkyl)methacrylates, polyalkylacrylamides (including unsubstituted and mono-N— and di-N—($C_{1-8}$ alkyl)acrylamides), polyolefins (e.g., polyethylenes, such as high density polyethylene (HDPE), low density polyethylene (LDPE), and linear low density polyethylene (LLDPE), polypropylenes, and their halogenated derivatives (such as polytetrafluoroethylenes), and their copolymers, for example ethylene-alpha-olefin copolymers, polyoxadiazoles, polyoxymethylenes, polyphthalides, polysilazanes, polysiloxanes (silicones), polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, vinyl polymers (including polyvinyl alcohols, polyvinyl esters, polyvinyl ethers, polyvinyl halides (e.g., polyvinyl chloride), polyvinyl ketones, polyvinyl nitriles, and polyvinyl thioethers), or the like. A combination comprising at least one of the foregoing thermoplastic polymers can be used.

Thermoset polymers include alkyds, bismaleimide polymers, bismaleimide triazine polymers, cyanate ester polymers, benzocyclobutene polymers, benzoxazine polymers, diallyl phthalate polymers, epoxies, hydroxymethylfuran polymers, melamine-formaldehyde polymers, phenolics (including phenol-formaldehyde polymers such as novolacs and resoles), benzoxazines, polydienes such as polybutadienes (including homopolymers and copolymers thereof, e.g. poly(butadiene-isoprene)), polyisocyanates, polyureas, polyurethanes, triallyl cyanurate polymers, triallyl isocyanurate polymers, certain silicones, and polymerizable prepolymers (e.g., prepolymers having ethylenic unsaturation, such as unsaturated polyesters, polyimides), or the like. The prepolymers can be polymerized, copolymerized, or crosslinked, e.g., with a reactive monomer such as styrene, alpha-methylstyrene, vinyltoluene, chlorostyrene, acrylic acid, (meth)acrylic acid, a ($C_{1-6}$ alkyl)acrylate, a ($C_{1-6}$ alkyl)methacrylate, acrylonitrile, vinyl acetate, allyl acetate, triallyl cyanurate, triallyl isocyanurate, or acrylamide.

Flame Retardant Layer

The flame retardant layer can include a flame retardant inorganic material such as boehmite, aluminum hydroxide, magnesium hydroxide, an intumescent material, or a combination thereof.

The intumescent material can include an acid source, a blowing agent, and a carbon source. Each component can be present in separate layers or as an admixture, preferably an intimate admixture. For example, the intumescent material can include a polyphosphate acid source, a blowing agent, and a pentaerythritol carbon source. Without being bound by theory, it is believed that the intumescent material can reduce the spread of flames using two energy absorbing mechanisms, including forming a char and then swelling the char. For example, as the temperature reaches a value, for example, of 200 to 280° C., the acidic species (for example, of the polyphosphate acid) can react with the carbon source (for example, pentaerythritol) to form a char. As the temperature increases, for example, to 280 to 350° C., the blowing agent can then decompose to yield gaseous products that cause the char to swell.

The acid source can include, for example, an organic or an inorganic phosphorous compound, an organic or inorganic sulfate (for example, ammonium sulfate), or a combination thereof. The organic or inorganic phosphorous compound can include an organophosphate or organophosphonate (for example, tris(2,3-dibromopropyl)phosphate, tris(2-chloroethyl)phosphate, tris(2,3-dichloropropyl)phosphate, tris(1-chloro-3-bromoisopropyl) phosphate, bis(1-chloro-3-bromoisopropyl)-1-chloro-3-bromoisopropyl phosphonate, polyaminotriazine phosphate, melamine phosphate, triphenyl phosphate, or guanylurea phosphate); an organophosphite ester (for example, trimethyl phosphite, or triphenyl phosphite); a phosphazene (for example, hexaphenoxycyclotriphosphazene); a phosphorus-containing inorganic compound (for example, phosphoric acid, phosphorus acid, a phosphite, urea phosphate, an ammonium phosphate (for example, ammonium monohydrogen phosphate, ammonium dihydrogen phosphate, or ammonium polyphosphate)); or a combination thereof.

The blowing agent can include an agent that decomposes (for example, into smaller compounds such as ammonia or carbon dioxide) at a temperature of greater than or equal to 120° C., for example, at 120 to 200° C., or at 130 to 200° C. The blowing agent can include a dicyandiamide, an azodicarbonamide, a melamine, a guanidine, a glycine, a urea (for example, a urea-formaldehyde resin or a methylolated guanylurea phosphate), a halogenated organic material (for example, a chlorinated paraffin), or a combination thereof.

The intumescent material can include a carbon source. The compressible layer, e.g., polyurethane foam, can function as the carbon source. The carbon source can include dextrin, a phenol-formaldehyde resin, pentaerythritol (for example, a dimer or trimer thereof), a clay, a polymer (for example, polyamide 6, an amino-poly(imidazoline-amid), or polyurethane), or a combination thereof. The amino-poly (imidazoline-amid) can include repeating amide linkages and imidazoline groups.

The intumescent material can optionally further include a binder. The binder can include an epoxy, a polysulfide, a polysiloxane, a polysilarylene, or a combination thereof. The binder can be present in the intumescent material in an amount of less than or equal to 50 wt %, or 5 to 50 wt %, or 35 to 45 wt %, based on the total weight of the intumescent material. The binder can be present in the intumescent material in an amount of 5 to 95 wt %, or 40 to 60 wt % based on the total weight of the intumescent material.

The intumescent material can optionally include a synergistic compound to further improve the flame retardance of the intumescent material. The synergistic compound can include a boron compound (e.g., zinc borate, boron phosphate, or boron oxide), a silicon compound, an aluminosilicate, a metal oxide (e.g., magnesium oxide, ferric oxide, or aluminum oxide hydrate (boehmite)), a metal salt (e.g. alkali metal or alkaline earth metal salts of organosulfonic acids or alkaline earth metal carbonates), or a combination thereof. Preferred synergistic combinations include phosphorus-containing compounds with at least one of the foregoing.

Adhesive Layer

A wide variety of adhesives are known in the art can be used in the thermally insulating multilayer sheet. The adhesive can be selected for ease of application and stability under the operating conditions of the battery. Each adhesive layer can the same or different, and be of the same or different thickness. Suitable adhesives include a phenolic resin, an epoxy adhesive, a polyester adhesive, a polyvinyl fluoride adhesive, an acrylic or methacrylic adhesive, or a silicone adhesive, preferably an acrylic adhesive or a silicone adhesive. In an aspect, the adhesive is a silicone adhesive. Solvent-cast, hot-melt, and two-part adhesives can be used.

Each of the adhesive layers can independently have a thickness of 0.00025 to 0.010 inches (0.006 to 0.25 mm), or 0.0005 to 0.003 inches (0.01 to 0.08 mm).

Additional Layer

Additional layers can be present in the thermally insulating multilayer sheets to improve manufacturing, handling, performance, or other desired characteristics. For example, a support layer can be disposed on, or directly on the aerogel or the compressible layer to improve easy of handling. Such layers can be polymer layers, for example polyimide, polyetherimide, polyester (e.g., polybutylene terephthalate or polyethylene terephthalate), or the like.

When the thermally insulating multilayer sheet includes an adhesive layer, the thermally insulating multilayer sheet can further include a release layer. By "release layer" is meant any single or composite layer including a release coating, optionally supported by one or more additional layers including a release liner. The thickness of each of the release layers can be 5 to 150 µm, 10 to 125 µm, 20 to 100 µm, 40 to 85 µm, or 50 to 75 µm.

The thermally insulating multilayer sheets can be assembled by methods known in the art. The sheets can be assembled on a surface of a cell or other component of a battery (for example, a wall of a battery case. In an aspect, the sheet is assembled separately, and then placed or adhered to the cell, the component, or both. Each of the sheets can be manufactured separately, and then stacked (placed or adhered using, for example, one or more adhesive layers) in the desired order. Alternatively, one or more individual layers can be manufactured on another individual layer, for example by coating, casting, or laminating using heat and pressure. For example, in an aspect, the compressible layer in the form of a foam can be directly cast onto the thermal insulation layer, for example an aerogel. Lamination and direct coating or casting can decrease thickness and improve flame retardance by eliminating an adhesive layer.

In a preferred aspect, the thermally insulating multilayer sheet comprises a polyurethane foam as the compressible layer disposed on an aerogel, preferably a silica aerogel, more preferably a fiber-reinforced silica aerogel as the thermal insulation layer. A ratio of a thickness of the polyurethane foam to a thickness of the aerogel can be in a range of 1:10 to 10:1. In an aspect, an adhesive layer is not present between the polyurethane compressible layer and the aerogel thermal insulation layer. In any of these aspects, a flame retardant layer can optionally be disposed on a side of the aerogel opposite the compressible layer, or on a side of the compressible layer opposite the compressible layer.

The following examples are provided to illustrate the present disclosure. The examples are merely illustrative and are not intended to limit devices made in accordance with the disclosure to the materials, conditions, or process parameters set forth therein.

EXAMPLES

The following components listed in Table 1 were used in the examples.

TABLE 1

| Material | Description | Tradename | Manufacturer |
| --- | --- | --- | --- |
| Hollow glass microspheres | Density 0.46 grams per cubic centimeter (g/cm$^3$); D90 particle size 0.05 mm | GS46 | Sinosteel Group Corporation |
| Silicone resin | Moisture cure; solid content 50 wt %; viscosity at 25° C. 150 cp | Guibao 404 | Chengdu Guibao |

TABLE 1-continued

| Material | Description | Tradename | Manufacturer |
|---|---|---|---|
| Silica aerogel powder | Particle size 300 mesh; pore size 5-50 nm (90%); porosity >90 vol % | Kistler ® KSL6 | IBIH Corporation |
| Expanded vermiculite | 300 mesh size | | Baibo Mining Processing |
| Glass fabric | E-1080; thickness of about 0.046 mm | E-1080 | Shanghai Grace |
| Boehmite | AlOOH | BG-611 | AnHui Estone |
| Aluminum hydroxide | Al(OH)$_3$ | JATH-0010E | AnHui Estone |
| Magnesium hydroxide | Mixed with aluminum hydroxide | NANO-511 | AnHui Estone |
| Intumescent flame retardant coating | Aqueous based intumescent flame retardant coating | Steelmaster 60WB | Jotun |
| PU1 | Polyurethane foam; thickness 1.5 mm | PORON ® 92RL-12059-04 | Rogers Corporation |
| PU2 | Polyurethane foam; density 160 kg/m$^3$ measured according to ASTM D 3574-95, Test A; thickness 1-3 mm; CFD 41-83 kPa measured with 0.51 cm/minute strain rate and force measured at 25% deflection; compression set 5% max. measured according to ASTM D 3574-95 Test D at 70° C. | PORON ® 4701-43RL-12118-04 | Rogers Corporation |
| PU3 | Polyurethane foam; density 192 kg/m$^3$ measured according to ASTM D 3574-95, Test A; thickness 1-3 mm; CFD, 2-17 kPa measured with 0.51 cm/minute strain rate and force measured at 25% deflection; compression set 10% max. measured according to ASTM D 3574-95 Test D at 70° C. | PORON ® 4790-92-12 | Rogers Corporation |
| PU4 | Polyurethane foam; density 240 kg/m$^3$ measured according to ASTM D 3574-95, Test A; thickness 1-3 mm; CFD, 2-24 kPa measured with 0.51 cm/minute strain rate and force measured at 25% deflection; compression set 10% max. measured according to ASTM D 3574-95 Test D at 70° C. | PORON ® 4790-92-15 | Rogers Corporation |
| PU5 | Polyurethane foam; density 192 kg/m$^3$ measured according to ASTM D 3574-95, Test A; thickness 1-3 mm; CFD, 27-55 kPa measured with 0.51 cm/minute strain rate and force measured at 25% deflection; compression set 5% max. measured according to ASTM D 3574-95 Test D at 70° C. | PORON ® EVExtend 4701-43RL-10 | Rogers Corporation |
| Aerogel 1 | Flexible silica aerogel nanoporous insulation blanket with reinforcing fibers; thickness 0.5 mm | | NANO Tech |
| Aerogel 2 | Silica aerogel powder blended with polymer to form a film; thickness 0.3 mm | TEN300 | TENANOM |
| Aerogel 3 | Silica aerogel blended with polymer coated on polyethylene terephthalate film (total thickness: 0.33 mm) | TEF300 | TENANOM |
| Aerogel 4 | Silica aerogel blended with polymer (same as Aerogel 3) coated on a polyimide film with adhesive on one side of the film opposite the aerogel (total thickness: 0.36 mm) | Customized | TENANOM |
| Aerogel 5 | Flexible silica aerogel nanoporous insulation blanket with reinforcing oxidized polyacrylonitrile fibers; nominal thickness 0.08 inches (2 mm); nominal density 10.7 lb/ft$^3$ (0.17 g/cc); chloride content less than 35 ppm when tested using ASTM C871; tensile strength (stress at maximum load, typical value) 317 psi per modified ASTM D5034, single layer specimen at 1 inch (25.4 mm) width | PYROGEL ® 2250 | Aspen Aerogels |
| Aerogel 6 | Silica aerogel felt available in thicknesses of 0.5 mm, 1.0 mm, and 2.0 mm | EMD Aerogel | NANOTECH |

In the following examples, mixtures were made by mechanical mixing, for example hand mixing, using a bench top stirrer, or a blender. Mixtures were made at room temperature (21° C.).

In Examples 2, 3, 5, and 6, a silane coupling agent KH-550 was added to the mixtures.

Comparative Example 1

PU1 alone was tested.

Example 2

A mixture of hollow glass microspheres and silicone resin including 40 weight percent hollow glass microspheres based on a total weight of the mixture, was coated to a thickness of 0.3 mm by a doctor blade method on a first side of PU1 and after curing for 2 hours, the same mixture was coated on a second side of PU1 to the same thickness and cured.

Example 3

A mixture of silica aerogel powder and silicone resin, including 6 weight percent silica aerogel powder based on a total weight of the mixture, was coated to a thickness of 0.3 mm by a doctor blade method on a first side of PU1, and after curing for 2 hours, the same mixture was coated on a second side of PU1 to the same thickness and cured.

Example 4

A mixture of expanded vermiculite and silicone resin, including 20 weight percent expanded vermiculite based on a total weight of the mixture, was coated to a thickness of 0.3 mm by a doctor blade method on a first side of PU1, and after curing for 2 hours, the same mixture was coated on a second side of PU1 to the same thickness and cured.

Example 5

A mixture of hollow glass microspheres and silicone resin, including 40 weight percent hollow glass microspheres based on a total weight of the mixture, was coated to a thickness of 0.3 mm by a doctor blade method on one side of glass fabric. After curing for 2 hours, a layer of the coated glass fabric was stacked without adhesive, one on each side of PU1, with the glass fabric contacting PU1.

Example 6

A mixture of silica aerogel powder and silicone resin, including 6 weight percent silica aerogel powder based on a total weight of the mixture, was coated to a thickness of 0.3 mm by a doctor blade method on one side of glass fabric. After curing for 2 hours, the coated glass fabric was stacked without adhesive, one on each side of PU1, with the glass fabric contacting PU1.

Example 7

A mixture of expanded vermiculite and silicone resin, including 20 weight percent expanded vermiculite based on a total weight of the mixture, was coated to a thickness of 0.3 mm by a doctor blade method on one side of glass fabric. After curing for 2 hours, the coated glass fabric was stacked without adhesive, one on each side of PU1, with the glass fabric contacting PU1.

Example 8

Aerogel 1 (0.5 mm thickness) was stacked without adhesive, one on each side of PU1.

Example 9

Aerogel 2 (0.3 mm thickness) was stacked without adhesive, one on each side of PU1.

Example 10

Aerogel 3 was stacked on each side of PU1, with the PET film of Aerogel 3 contacting PU1.

Example 11

Aerogel 4 was adhered via the adhesive layer, one on each side of PU1 with the adhesive side of the PI film of Aerogel 4 contacting PU1.

Example 12

A mixture of boehmite and silicone resin, including 50% weight percent boehmite based on a total weight of the mixture, was coated to a thickness of 0.3 mm by a doctor blade method on one side of glass fabric. After curing for 2 hours, the coated glass fabric was stacked without adhesive, one on each side of PU1, with the glass fabric contacting PU1.

Example 13

A mixture of aluminum hydroxide and silicone resin, including 42% weight percent aluminum hydroxide based on a total weight of the mixture, was coated to a thickness of 0.3 mm by a doctor blade method on one side of one side of glass fabric. After curing for 2 hours, the coated glass fabric was stacked without adhesive, on each side of PU1, with the glass fabric contacting PU1.

Example 14

A mixture of aluminum hydroxide, magnesium hydroxide, and silicone resin, including 50% weight percent aluminum hydroxide and magnesium hydroxide based on a total weight of the mixture, was coated to a thickness of 0.3 mm by a doctor blade method on one side of glass fabric. After curing for 2 hours, the coated glass fabric was stacked without adhesive, one on each side of PU1, with the glass fabric contacting PU1.

Example 15

An intumescent flame retardant coating (thickness 0.45 mm) was coated by painting on one side of glass fabric. After curing, the painted glass fabric was stacked without adhesive, one on each side of PU1, with the glass fabric contacting PU1.

Example 16

A first layer was formed by coating a mixture of silica aerogel powder and silicone resin, including 6 weight percent silica aerogel powder based on a total weight of the mixture, to a thickness of 0.3 mm by a doctor blade method one side of glass fabric. A second layer was formed by coating by painting an intumescent flame retardant coating (thickness of 0.3 mm) on one side of a second glass fabric. The first layer was stacked without adhesive, one on each side of PU1, with the glass fabric of the first layers contacting PU1, and the second layer was stacked without adhesive, one on each of the outer surfaces of the first layers, with the glass fabric of the second layers contacting the mixture of silica aerogel powder and silicone resin of the first layers.

Example 17

A first layer was formed by adhering Aerogel 4, one on each side of PU1, with the adhesive side of the PI film of Aerogel 4 contacting PU1. A second layer was formed by coating by painting an intumescent flame retardant coating (thickness 0.24 mm) on one side of glass fabric. The second layer was stacked without adhesive, one on each of the outer surfaces of the first layers, with the glass fabric of the second layer contacting the silica aerogel blended with polymer of the first layers.

In Examples 18, 22-24, 26-28, and 30-32, a layer of the specified polyurethane foam was applied to a layer of the specified aerogel by lamination at 23° C., at a pressure of 1 psi (6.9 kPa), using a 0.001" (25.4 micrometers) thick layer of an acrylic adhesive.

Example 18

PU2 was applied to Aerogel 5, with a thickness ratio of Aerogel 5:PU2 of 2:1.

Comparative Example 19

PU2 alone was tested.

Comparative Example 20

Aerogel 5 alone was tested.

Comparative Example 21

PU3 alone was.

Example 22

PU3 was applied to Aerogel 5, with a thickness ratio of Aerogel 5:PU3 of 2:1.

Example 23

PU3 was applied to Aerogel 5, with a thickness ratio of Aerogel 5:PU3 of 1:1.

Example 24

PU3 was applied to Aerogel 5, with a thickness ratio of Aerogel 5:PU3 of 1:2.

Comparative Example 25

PU4 alone was tested.

Example 26

PU4 was applied to Aerogel 5, with a thickness ratio of Aerogel 5:PU4 of 2:1.

Example 27

PU4 was applied to Aerogel 5, with a thickness ratio of Aerogel 5:PU4 of 1:1.

Example 28

PU4 was applied to Aerogel 5, with a thickness ratio of Aerogel 5:PU4 of 1:2.

Comparative Example 29

PU5 alone was tested.

Example 30

PU5 was applied to Aerogel 5, with a thickness ratio of Aerogel 5:PU5 of 2:1.

Example 31

PU5 was applied to Aerogel 5, with a thickness ratio of Aerogel 5:PU5 of 1:1.

Example 32

PU5 was applied to Aerogel 5, with a thickness ratio of Aerogel 5:PU5 of 1:2.

Example 33

PU2 having a thickness of 1.5 mm was applied to Aerogel 6 having a thickness of 1.5 mm (formed by stacking Aerogel 6 having a thickness of 0.5 mm and Aerogel 6 having a thickness of 1.0 mm).

Example 34

PU2 having a thickness of 0.5 mm was formed from a PU2 sample having a thickness of 1.0 mm and applied to Aerogel 6 having a thickness of 1 mm.

Thermal Runaway Simulation

Figure 6:
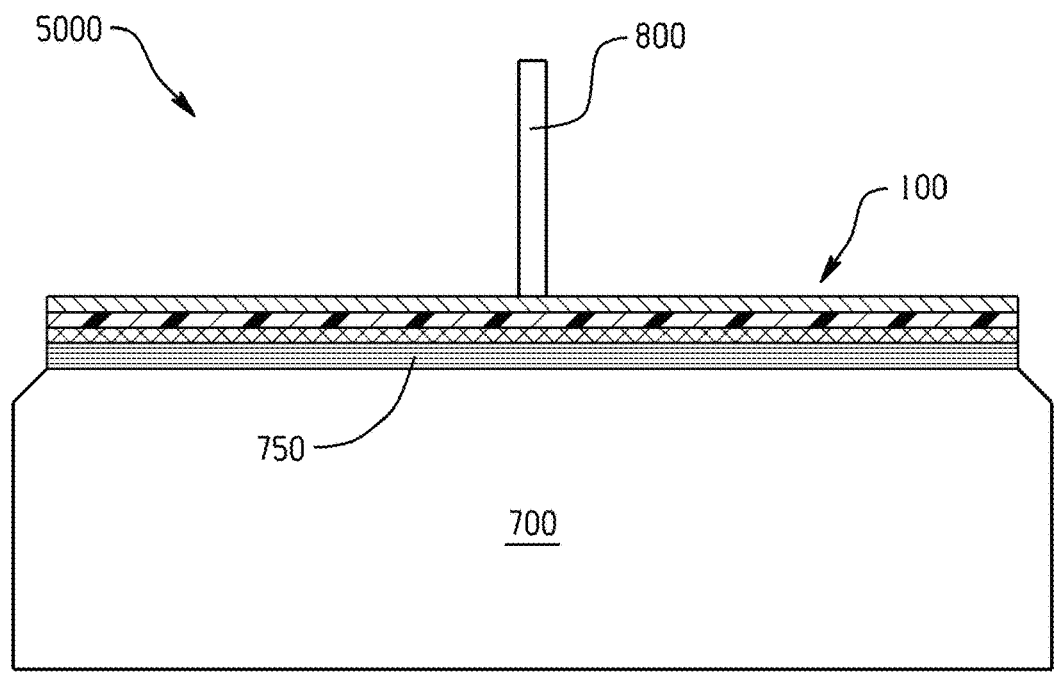
FIG. 6 is a schematic of an apparatus for a hot plate test.

Samples were evaluated in a test designed to simulate the high temperatures of a thermal runaway event. FIG. 6 illustrates a hot plate test apparatus 5000 used for Comparative Example 1 and Examples 2-17. A thermally insulating multilayer sheet for delaying or preventing thermal runaway 100 is disposed on hot plate 700. A 1-ounce electrodeposited (ED) copper foil 750 is placed between the thermally insulating multilayer sheet 100 and the hot plate 700 to protect the surface of the hot plate 700. A thermocouple sensor 800 is disposed on the thermally insulating multilayer sheet 100. The hotplate was preheated to a temperature of 500° C.

Figure 7:
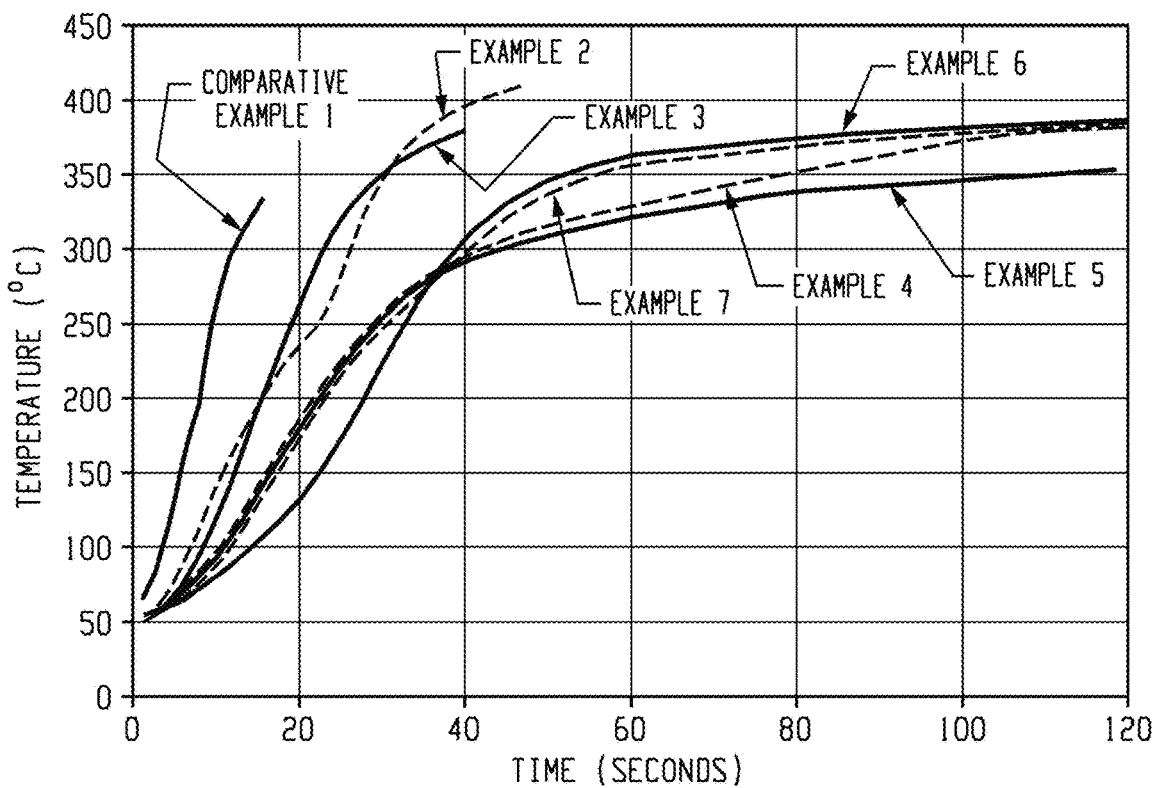
FIG. 7 is a graph of temperature (° C.) versus time (seconds) showing results of simulated thermal runaway testing of Comparative Example 1 and Examples 2 to 7.
Figure 8:
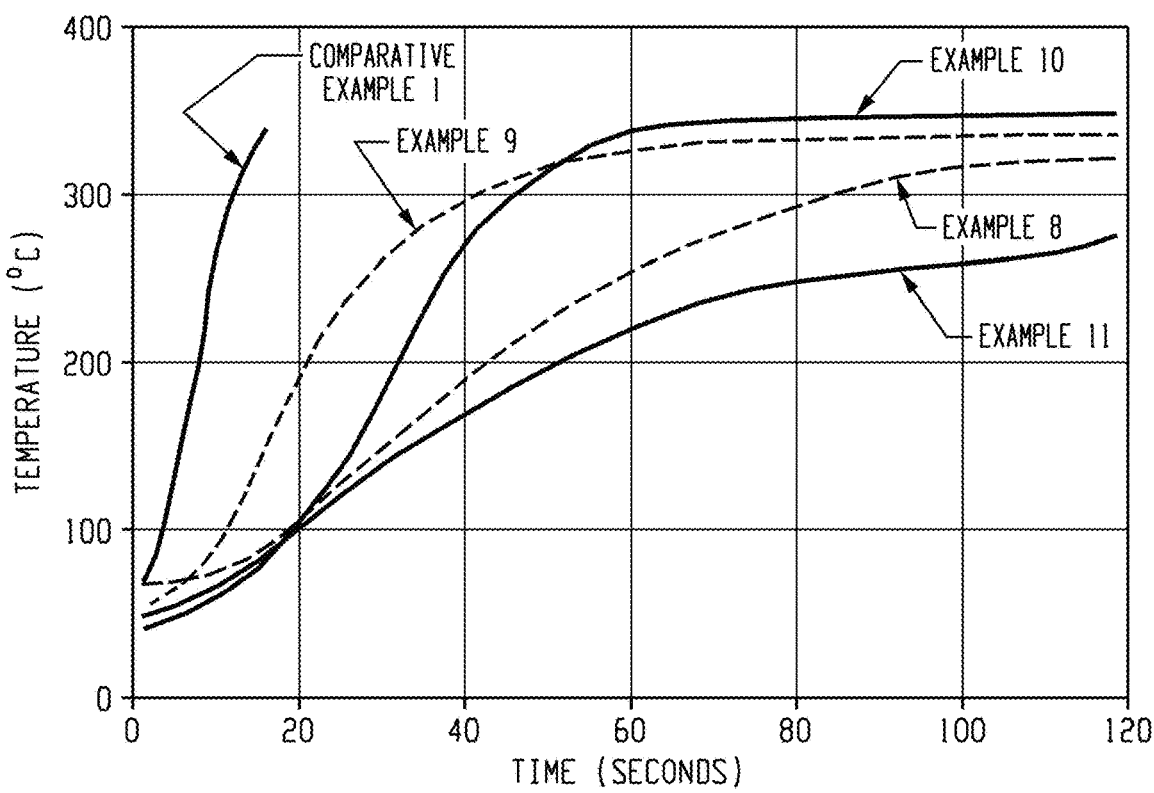
FIG. 8 is a graph of temperature (° C.) versus time (seconds) showing results of simulated thermal runaway testing of Comparative Example 1 and Examples 8 to 11.
Figure 9:
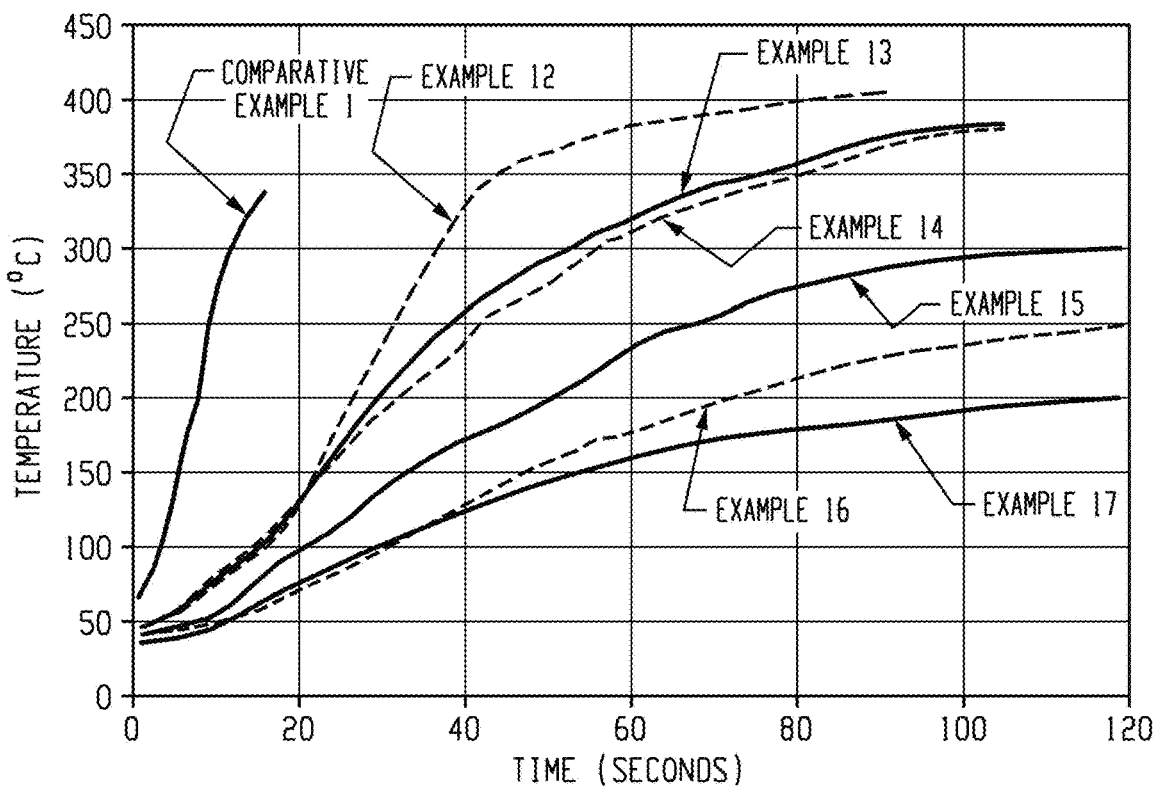
FIG. 9 is a graph of temperature (° C.) versus time (seconds) showing results of simulated thermal runaway testing of Comparative Example 1 and Examples 12 to 17.

Results after placing the thermally insulating multilayer sheet on the preheated hotplate were graphed as temperature (° C.) versus time (seconds). In FIGS. 7, 8, and 9, (i) Comparative Example 1 and Examples 2 to 7 are shown in FIG. 7, (ii) Comparative Example 1 and Examples 8 to 11 are shown in FIG. 8, and (iii) Comparative Example 1 and Examples 12 to 17 are shown in FIG. 9. With reference to FIG. 7, Examples 2 to 4 did not include glass fabric in the thermal insulation layer, while Examples 5 to 7 included glass fabric in the thermal insulation layer. A comparison of Example 2 with Example 5 and Example 3 with Example 6 shows that glass fabric can improve the thermal barrier effect, delaying heating. With reference to FIG. 8, the results of Example 11 as compared to the results of Examples 9 and 10 show that the presence of a polyimide layer can improve the thermal barrier effect. Table 2 provides results for time to reach 200° C. (seconds, sec) for Comparative Example 1 and Examples 2-17.

TABLE 2

| | CEx. 1 | Ex. 1 | Ex. 2 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|---|---|---|---|
| Time to reach 200° C. (sec) | 8 | 16 | 15 | 21 | 22 | 27 | 24 | 43 | 21 | 32 | 51 | 27 | 30 | 32 | 47 | 72 | 116 |

Figure 10:
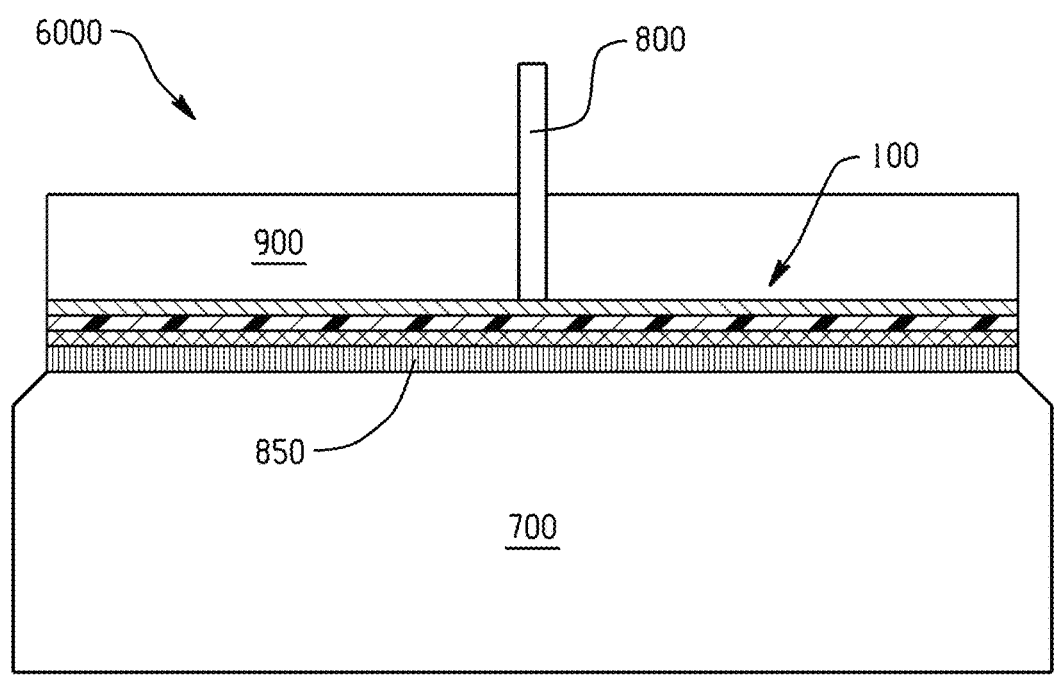
FIG. 10 is a schematic of an apparatus for a hot plate test.

FIG. 10 illustrates a hot plate test apparatus 6000 used for Example 18 and Comparative Example 19. A thermally insulating multilayer sheet for delaying or preventing thermal runaway 100 is disposed on hot plate 700 with a thermal insulation layer, for example, aerogel, closest to the hot plate. A 0.001" aluminum foil 850 is placed between the thermally insulating multilayer sheet 100 and the hot plate 700 to protect the surface of the hot plate 700. A 12.7 mm mica plate cell analog 900 is disposed on the thermally insulating multilayer sheet 100. A through hole is drilled into the electrochemical cell analog 900 on a face opposite the thermally insulating multilayer sheet 100 and a thermocouple sensor 800 is inserted.

Figure 11:
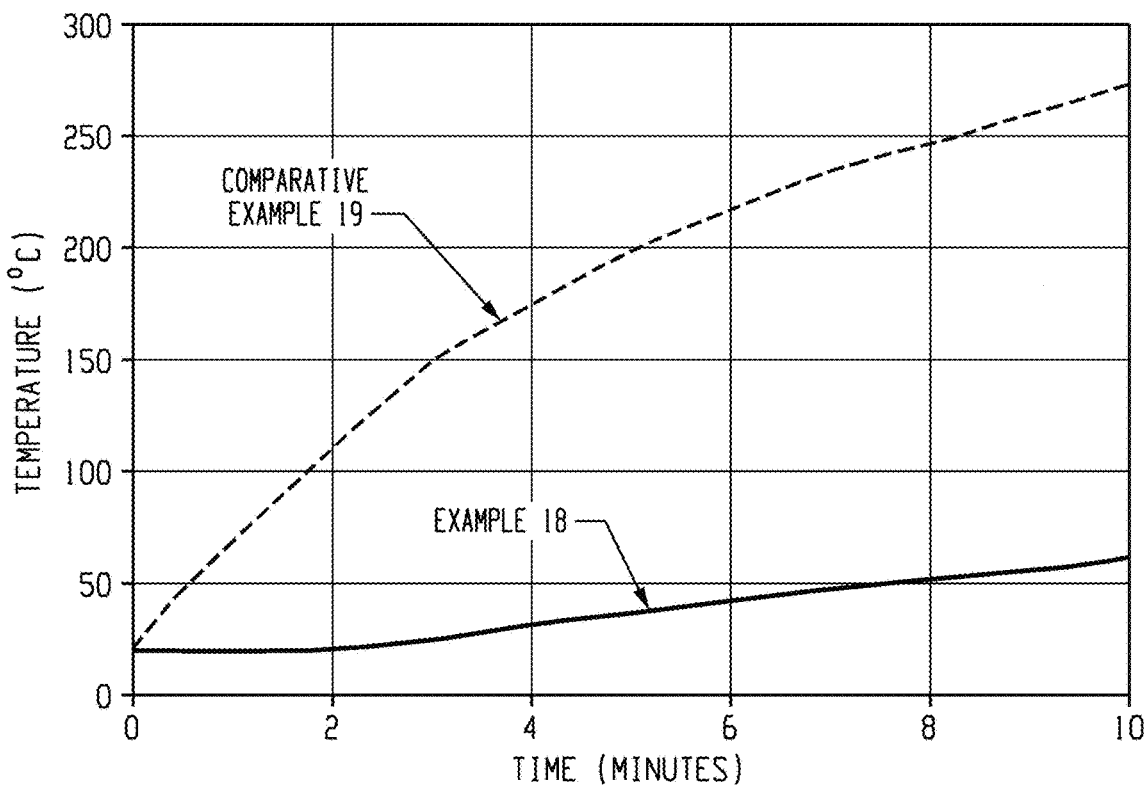
FIG. 11 is a graph of temperature (° C.) versus time (minutes (min)) showing results of simulated thermal runaway testing of Example 18 and Comparative Example 19.

The hotplate was preheated to a temperature of 550° C. for 10 minutes and the thermally insulating multilayer sheet was placed on the preheated hotplate. Results (temperature (° C.) versus time (minutes (min))) for Example 18 and Comparative Example 19 are shown in FIG. 11. With reference to FIG. 11, Example 18 had a lower temperature than Comparative Example 19 at all times, driven by the low thermal conductivity and inherent burn resistance of the aerogel. Comparative Example 19 reached a temperature of 150° C. after about 3 minutes, while Example 18 did not even reach a temperature of 100° C. even after 10 minutes.

Firmness

Firmness of Examples 20-32 was measured using compression force deflection (CFD) using a test based on ASTM D 3574. Samples measuring 2 inches (5.08 centimeters (cm))×2 inches were compressed at a constant rate of 0.2 inches (0.5 cm) per minute and the amount of force (stress (pounds per square inch (psi)) that the sample exerted at different levels of compression strain (percent (%)) was recorded.

Figure 12:
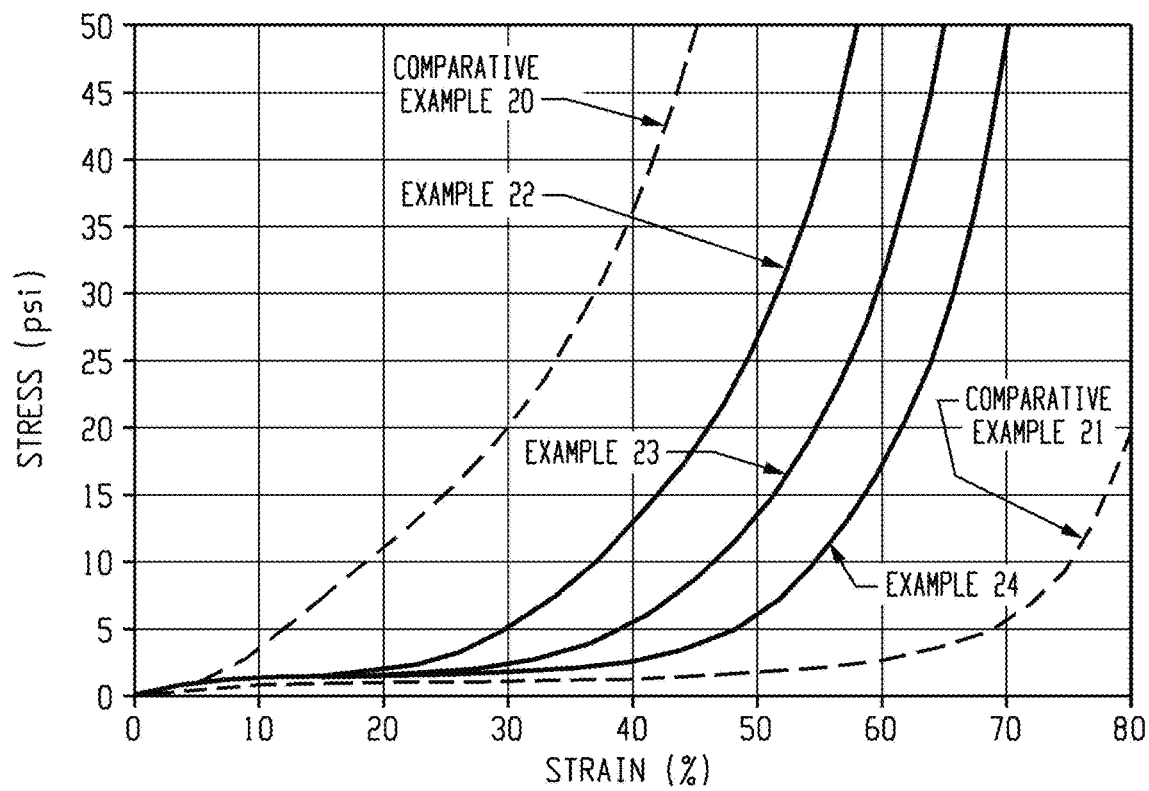
FIG. 12 is a graph of stress (pounds per square inch (psi)) versus strain (percent (%)) showing compression force deflection (CFD) curves of Comparative Examples 20 and 21 and Examples 22 to 24.
Figure 13:
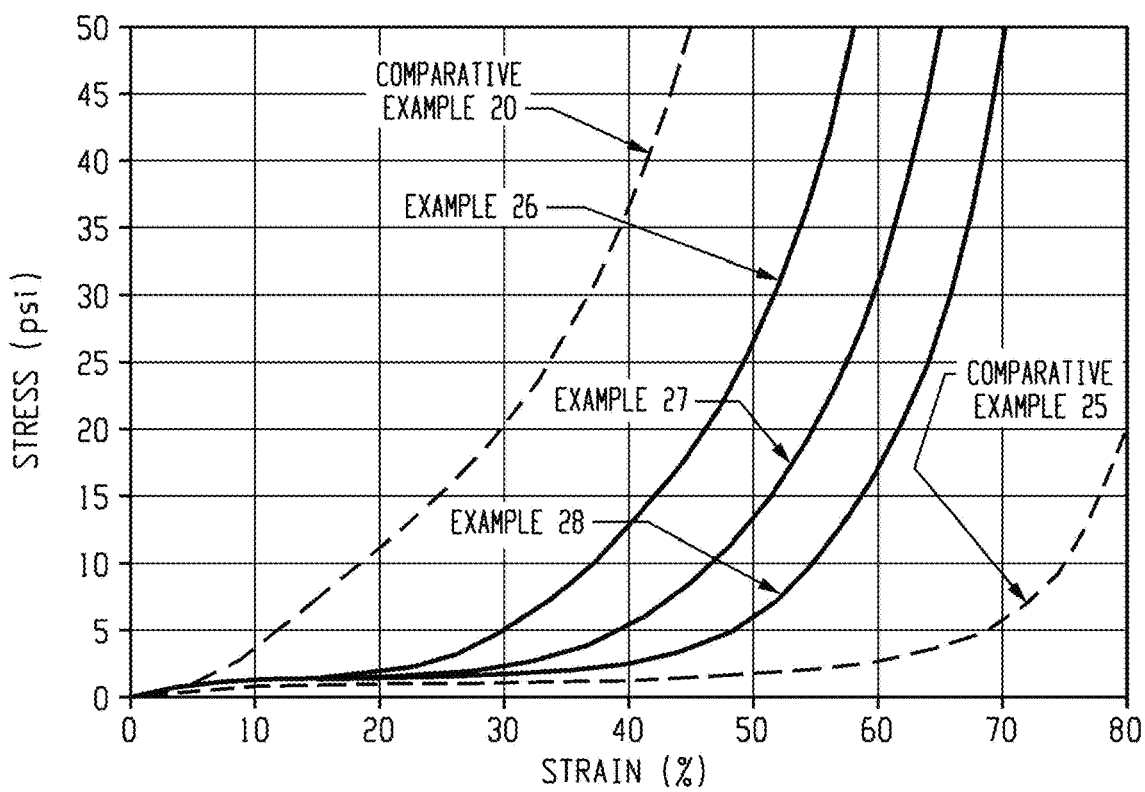
FIG. 13 is a graph of stress (psi) versus strain (%) showing compression force deflection curves of Comparative Examples 20 and 25 and Examples 26 to 28.
Figure 14:
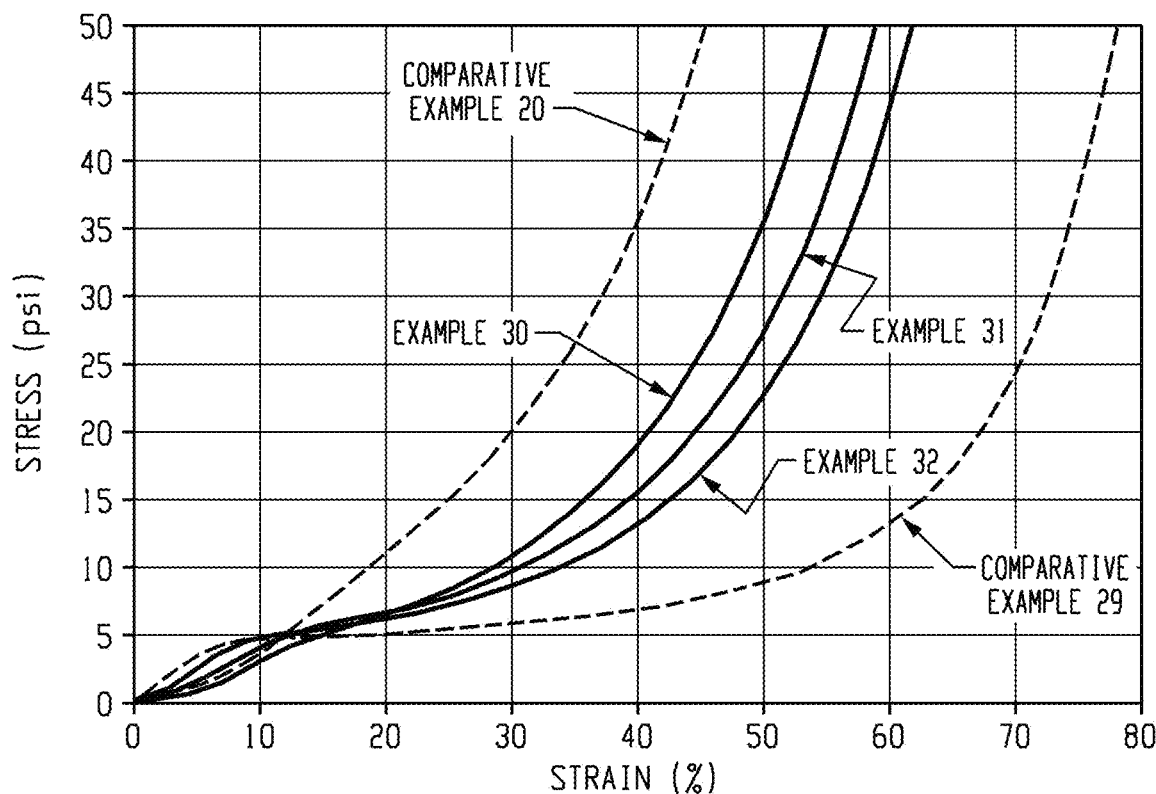
FIG. 14 is a graph of stress (psi) versus strain (%) showing compression force deflection curves of Comparative Examples 20 and 29 and Examples 30 to 32.

Results are shown in FIGS. 12-14. Examples 22-24, 26-28, and 30-32 (polyurethane and aerogel) resulted in a desirable flatter compression force deflection curve than Comparative Example 20 (Aerogel 5).

Nail Penetration Testing

Figure 15:
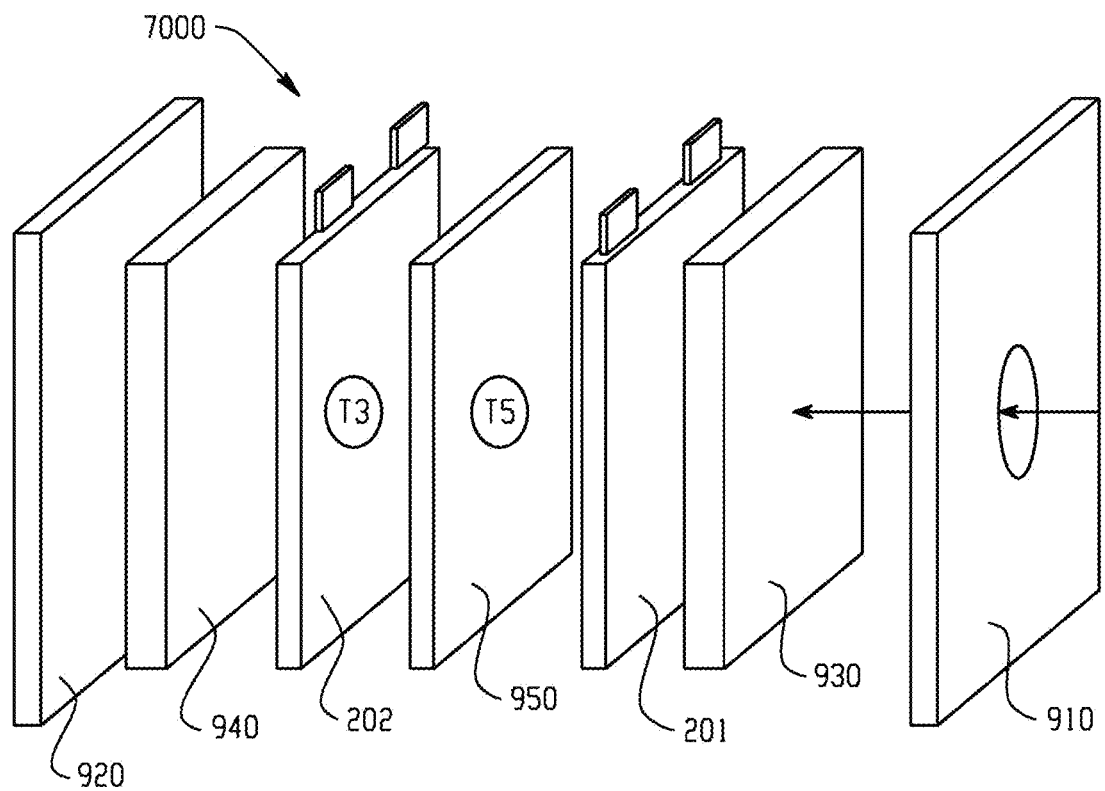
FIG. 15 is a schematic of an apparatus for nail penetration testing.
Figure 16:
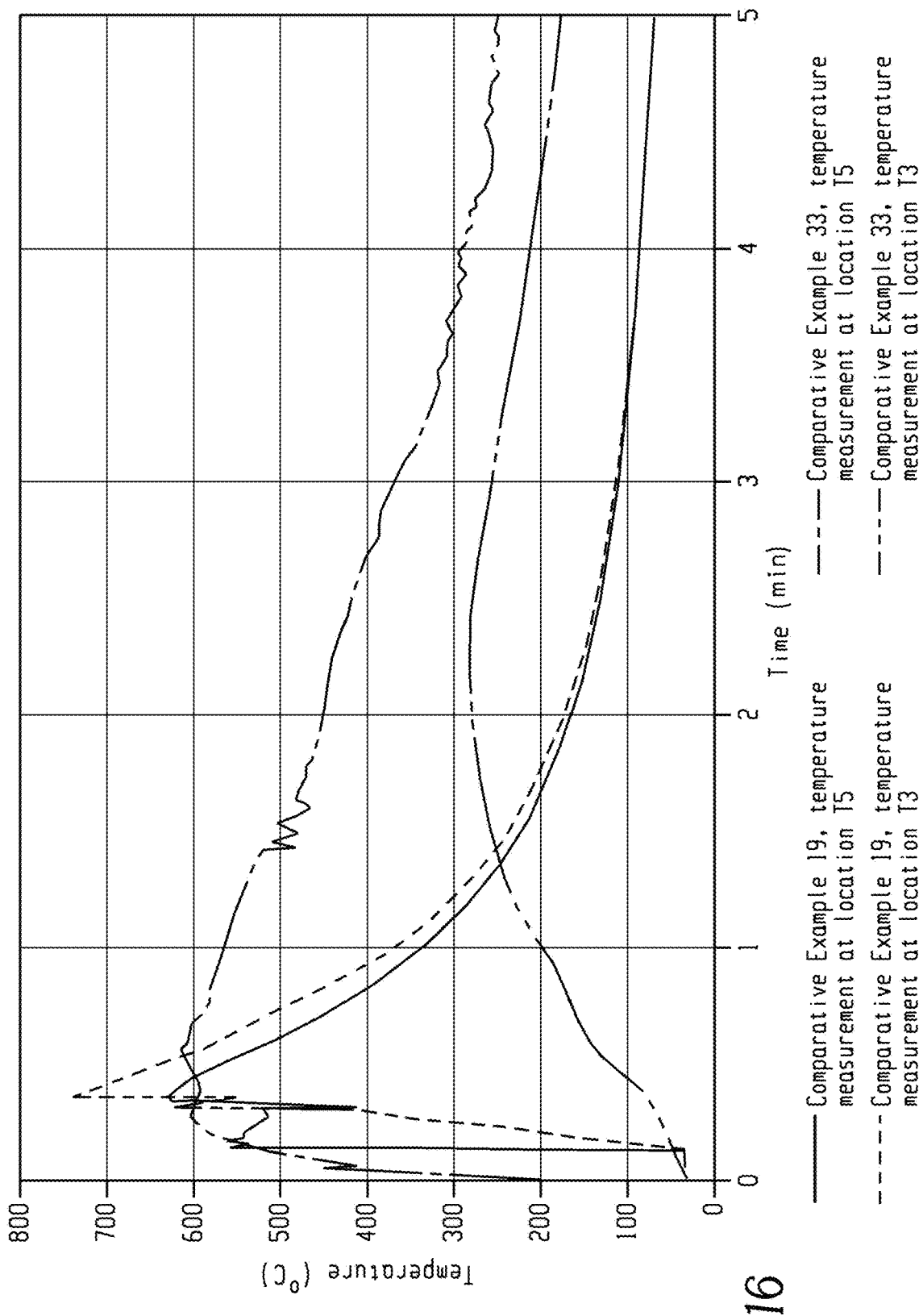
FIG. 16 is a graph of temperature (° C.) versus time (min) showing results of nail penetration testing of Comparative Example 19 and Example 33.
Figure 17:
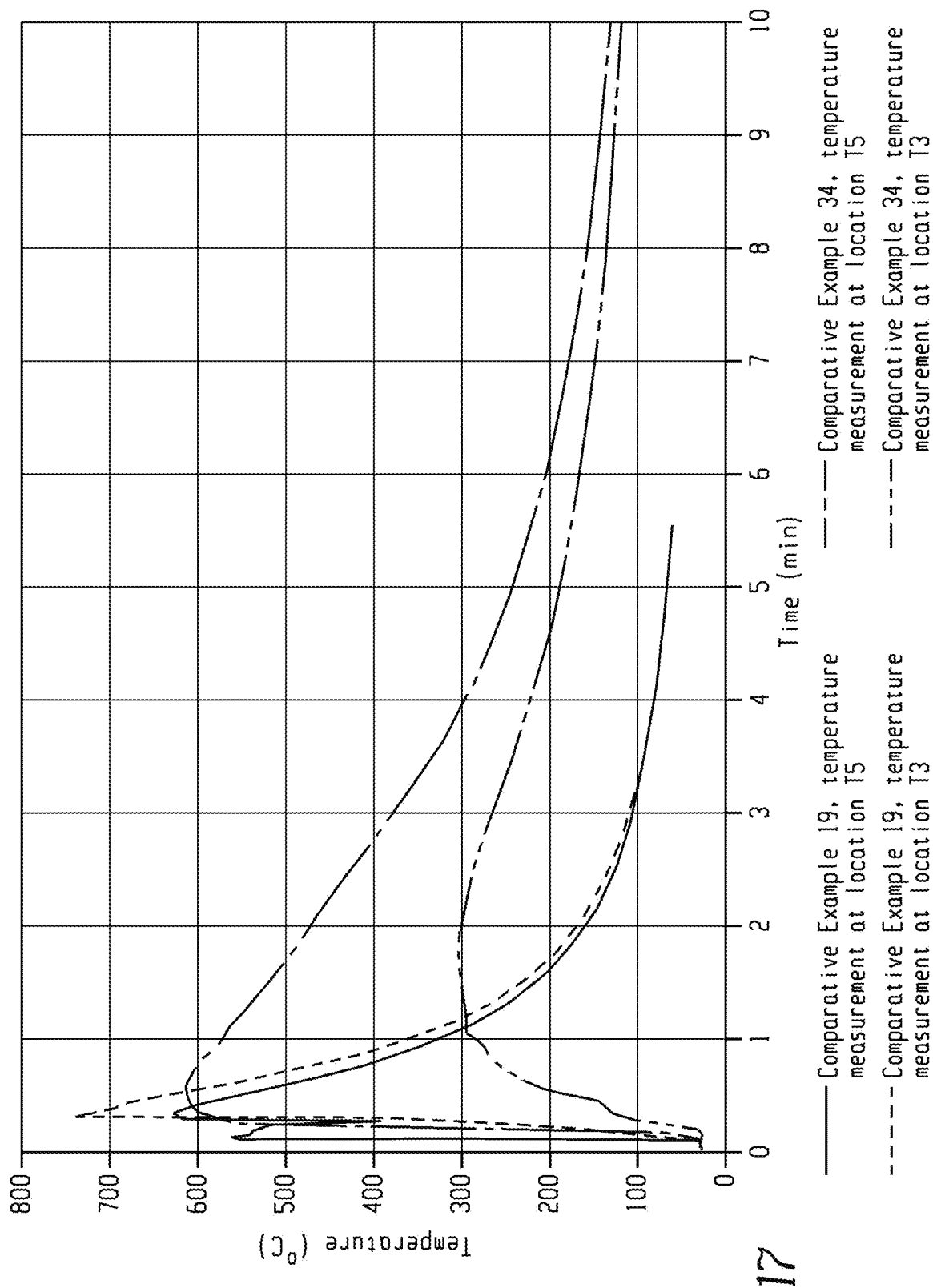
FIG. 17 is a graph of temperature (° C.) versus time (min) showing results of nail penetration testing of Comparative Example 19 and Example 34.

Nail penetration testing was performed. FIG. 15 is a schematic of an apparatus 7000 for the nail penetration testing, including aluminum end plates 910, 920 (having dimensions of 185 mm×90 mm×15.2 mm), polytetrafluoroethylene insulation film 930, 940 (having dimensions of 185 mm×90 mm×1 mm), pouch cells 201, 202, and the sample 950 tested (for example, the thermally insulating multilayer sheet). The cells 201, 202 were 80 ampere-hour (Ah) lithium-ion, nickel manganese cobalt (NMC) cells. Cell 201 was punctured by an 8 mm nail to initiate runaway. The cells 201, 202 were electrically isolated. Nine thermocouples measured the temperature profile. Location T3 was between failing cell 201 and the sample 950 tested and location T5 was between the sample 950 tested and neighboring cell 202. Voltage was also measured. FIG. 16 is a graph of temperature (° C.) versus time (min) showing results of the nail penetration testing of Comparative Example 19 and Example 33. FIG. 17 is a graph of temperature (° C.) versus time (min) showing results of the nail penetration testing of Comparative Example 19 and Example 34. As shown in FIG. 16 and FIG. 17, Examples 33 and 24 were able to stop thermal runaway in the test.

Set forth below are non-limiting aspects of the present disclosure.

Aspect 1: A thermally insulating multilayer sheet for delaying or preventing thermal runaway comprising a compressible layer comprising an aerogel or a polymer matrix comprising microspheres.

Aspect 2: The thermally insulating multilayer sheet for delaying or preventing thermal runaway of Aspect 1, wherein the thermal insulation layer comprises an aerogel.

Aspect 3: The thermally insulating multilayer sheet for delaying or preventing thermal runaway of Aspect 1 or 2, wherein the thermal insulation layer has a thickness of 0.002 to 0.039 inches (0.05 to 0.99 millimeters), preferably 0.006 to 0.020 inches (0.15 to 0.5 millimeters).

Aspect 4: The thermally insulating multilayer sheet for delaying or preventing thermal runaway of any one of the foregoing Aspects, wherein the thermal insulation layer has a thermal conductivity of 0.01 to 0.09 W/m*K at 23° C., a heat of fusion of 70 to 350 J/g, or a combination thereof.

Aspect 5: The thermally insulating multilayer sheet for delaying or preventing thermal runaway of any one of the foregoing Aspects, further comprising a flame retardant layer, wherein the flame retardant layer comprises boehmite, aluminum hydroxide, magnesium hydroxide, an intumescent material, or a combination thereof.

Aspect 6: The thermally insulating multilayer sheet for delaying or preventing thermal runaway of any one of the foregoing Aspects, further comprising a flame retardant layer, wherein the flame retardant layer is disposed on a first side of the thermal insulation layer, and a second, opposite side of the thermal insulation layer is disposed on the compressible layer.

Aspect 7: The thermally insulating multilayer sheet for delaying or preventing thermal runaway of Aspect 6, further comprising an additional thermal insulation layer disposed on a side of the compressible layer opposite to the thermal insulation layer.

Aspect 8: The thermally insulating multilayer sheet for delaying or preventing thermal runaway of Aspect 7, further comprising an additional flame retardant layer disposed on the additional thermal insulation layer opposite to the compressible layer.

Aspect 9: The thermally insulating multilayer sheet for delaying or preventing thermal runaway of Aspect 6, further comprising an additional flame retardant layer disposed on a second side of the compressible layer opposite the thermal insulation layer.

Aspect 10: The thermally insulating multilayer sheet for delaying or preventing thermal runaway of any one of Aspects 1 to 9, wherein the compressible layer comprises a polyurethane foam and the thermal insulation layer comprises an aerogel.

Aspect 1: The thermally insulating multilayer sheet for delaying or preventing thermal runaway of Aspect 10, wherein a ratio of a thickness of the polyurethane foam to a thickness of the aerogel is in a range of 1:10 to 10:1.

Aspect 12: The thermally insulating multilayer sheet for delaying or preventing thermal runaway of Aspect 10 or 11, wherein the polyurethane foam has a density of 5 to 65 pounds per cubic foot (80 to 1,041 kilograms per cubic meter), preferably 6 to 20 pounds per cubic foot (96 to 320 kilograms per cubic meter), more preferably 8 to 15 pounds per cubic foot (128 to 240 kilograms per cubic meter); a thickness of 0.2 to 30 millimeters, preferably 0.5 to 6 millimeters, more preferably 1 to 3 millimeters; a compression force deflection of 0.2 to 125 psi (1 to 862 kilopascals), preferably 0.25 to 20 psi (1.7 to 138 kilopascals), more preferably 0.5 to 10 psi (3.4 to 68.90.5 kilopascals) each at 25% deflection determined in accordance with ASTM D3574-17; and a compression set of 0 to 15%, preferably 0 to 10%, more preferably 0 to 5%, determined in accordance with ASTM D 3574-95 Test D at 70° C.

Aspect 13: The thermally insulating multilayer sheet for delaying or preventing thermal runaway of any one of Aspects 10 to 12, wherein the thermally insulating multilayer sheet for delaying or preventing thermal runaway has a thickness of 0.2 to 30 millimeters, preferably 0.5 to 10 millimeters, more preferably 1 to 3 millimeters; and a density of 6 to 30 pounds per cubic foot (96 to 481 kilograms per cubic meter), preferably 6 to 15 pounds per cubic foot (96 to 240 kilograms per cubic meter), more preferably 6 to 10 pounds per cubic foot (96 to 160 kilograms per cubic meter).

Aspect 14: The thermally insulating multilayer sheet for delaying or preventing thermal runaway of any one of Aspects 10 to 13, wherein a density of the aerogel is 1 to 20 pounds per cubic foot (16 to 320 kilograms per cubic meter), preferably 2 to 15 pounds per cubic foot (32 to 240 kilograms per cubic meter), more preferably 2 to 10 pounds per cubic foot (32 to 160 kilograms per cubic meter).

Aspect 15: The thermally insulating multilayer sheet for delaying or preventing thermal runaway of any one of Aspects 10 to 14, wherein a thickness of the aerogel is 0.5 to 10 millimeters, preferably 1 to 6 millimeters, more preferably 1 to 3 millimeters.

Aspect 16: The thermally insulating multilayer sheet for delaying or preventing thermal runaway of any one of Aspects 10 to 15, wherein the aerogel comprises a silica aerogel comprising reinforcing fibers.

Aspect 17: The thermally insulating multilayer sheet for delaying or preventing thermal runaway of Aspect 16, wherein the reinforcing fibers comprises polyester, oxidized polyacrylonitrile, carbon, silica, polyaramid, polycarbonate, polyolefin, rayon, nylon, fiberglass, high density polyolefin, ceramics, acrylics, fluoropolymer, polyurethane, polyamide, polyimide, or a combination thereof.

Aspect 18: An electrochemical cell, comprising the thermally insulating multilayer sheet for delaying or preventing thermal runaway of any one the foregoing Aspects disposed on at least a portion of at least one surface of the electrochemical cell.

Aspect 19: The electrochemical cell of Aspect 18, wherein the thermally insulating multilayer sheet for delaying or preventing thermal runaway is disposed on at least two surfaces of the electrochemical cell.

Aspect 20: The electrochemical cell of Aspect 18 or 19, wherein the electrochemical cell comprises a prismatic cell, pouch cell, or cylindrical cell, preferably a pouch cell.

Aspect 21: An unconnected array, comprising at least two electrochemical cells of any one of Aspects 18 to 20.

Aspect 22: A battery, comprising the electrochemical cell of any one of Aspects 18 to 20 or the unconnected array of Aspect 21.

Aspect 23: The battery of Aspect 22, further comprising a battery case at least partially enclosing the electrochemical cell or the unconnected array.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced items. The term "or" means "and/or" unless clearly indicated otherwise by context. Reference throughout the specification to "an aspect", "another aspect", and so forth, means that a particular element (e.g., feature, structure, step, or characteristic) described in connection with the aspect is included in at least an aspect described herein, and may or may not be present in other aspects. In addition, it is to be understood that the described elements may be combined in any suitable manner in the various aspects.

As used herein, the "diameter" of a particle refers to a diameter of a sphere or an equivalent diameter obtained from a particle size analyzer or from a two-dimensional image of an electron microscopy analysis, for example a transmission electron microscopy image analyzed using a program such as Image J. In an aspect, "a size" refers to a size of a single particle or a (e.g., a mean or a median) average of particles or a population of particles.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.). The terms "first," "second," and the like, "primary," "secondary," and the like, as used herein do not denote any order, quantity, or importance, but rather are used to distinguish one element from another. The term "combinations comprising at least one of the foregoing" or "at least one of" means that the list is inclusive of each element individually, as well as combinations of two or more elements of the list, and combinations of at least one element of the list with like elements not named. Also, the term "combination" is inclusive of blends, mixtures, alloys, reaction products, and the like.

Unless defined otherwise, technical and scientific terms used herein have the same meaning as is commonly understood by one of skill in the art to which this disclosure belongs.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

In the drawings, the widths and thicknesses of layers and regions are exaggerated for clarity of the specification and convenience of explanation. Like reference numerals in the drawings denote like elements.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A thermally insulating multilayer sheet comprising
a compressible layer comprising a polyurethane foam, and
a thermal insulation layer comprising an aerogel,
wherein the compressible layer has a thickness of 1 to 3 millimeters,
wherein the polyurethane foam has
a density of 5 to 65 pounds per cubic foot;
a compression force deflection of 0.2 to 125 psi, at 25% deflection determined in accordance with ASTM D3574-17; and
a compression set of 0 to 15%, determined in accordance with ASTM D 3574-95 Test D at 70° C.

2. The thermally insulating multilayer sheet of claim 1, wherein the thermal insulation layer has a thickness of 1 to 3 millimeters.

3. The thermally insulating multilayer sheet of claim 1, wherein the thermal insulation layer has a thermal conductivity of 0.01 to 0.09 W/m*K at 23° C., a heat of fusion of 70 to 350 J/g, or a combination thereof.

4. The thermally insulating multilayer sheet of claim 1, further comprising a flame retardant layer, wherein the flame retardant layer comprises boehmite, aluminum hydroxide, magnesium hydroxide, an intumescent material, or a combination thereof.

5. The thermally insulating multilayer sheet of claim 1, further comprising a flame retardant layer, wherein the flame retardant layer is disposed on a first side of the thermal insulation layer, and a second, opposite side of the thermal insulation layer is disposed on the compressible layer.

6. The thermally insulating multilayer sheet of claim 5, further comprising an additional thermal insulation layer disposed on a side of the compressible layer opposite to the thermal insulation layer.

7. The thermally insulating multilayer sheet of claim 6, further comprising an additional flame retardant layer disposed on the additional thermal insulation layer opposite to the compressible layer.

8. The thermally insulating multilayer sheet of claim 5, further comprising an additional flame retardant layer disposed on a second side of the compressible layer opposite the thermal insulation layer.

9. The thermally insulating multilayer sheet of claim 1, wherein a ratio of a thickness of the polyurethane foam to a thickness of the aerogel is in a range of 1:10 to 10:1.

10. The thermally insulating multilayer sheet of claim 1, wherein the thermally insulating multilayer sheet has
a thickness of greater than 1 to 3 millimeters; and
a density of 6 to 30 pounds per cubic foot.

11. The thermally insulating multilayer sheet of claim 1, wherein a density of the aerogel is 1 to 20 pounds per cubic foot.

12. The thermally insulating multilayer sheet of claim 1, wherein a thickness of the aerogel is 1 to 3 millimeters.

13. The thermally insulating multilayer sheet of claim 1, wherein the aerogel comprises a silica aerogel comprising reinforcing fibers.

14. The thermally insulating multilayer sheet of claim 13, wherein the reinforcing fibers comprises polyester, oxidized polyacrylonitrile, carbon, silica, polyaramid, polycarbonate, polyolefin, rayon, nylon, fiberglass, high density polyolefin, ceramics, acrylics, fluoropolymer, polyurethane, polyamide, polyimide, or a combination thereof.

15. An electrochemical cell, comprising
the thermally insulating multilayer sheet of claim 1 disposed on at least a portion of at least one surface of the electrochemical cell.

16. The electrochemical cell of claim 15, wherein the thermally insulating multilayer sheet is disposed on at least two surfaces of the electrochemical cell.

17. The electrochemical cell of claim 15, wherein the electrochemical cell comprises a prismatic cell, pouch cell, or cylindrical cell.

18. An unconnected array, comprising at least two of the electrochemical cells of claim 15.

19. A battery, comprising the electrochemical cell of claim 15.

20. The battery of claim 19, further comprising a battery case at least partially enclosing the electrochemical cell or the unconnected array.

* * * * *